(12) United States Patent
Kakutani et al.

(10) Patent No.: US 8,976,419 B2
(45) Date of Patent: Mar. 10, 2015

(54) IMAGE FORMING APPARATUS, CONTROL METHOD AND STORAGE MEDIUM FOR DESIGNATING IMAGE FORMATION ON A SHEET

(71) Applicant: Canon Kabushiki Kaisha, Tokyo (JP)

(72) Inventors: Naoya Kakutani, Kawasaki (JP); Hiroki Takeishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 40 days.

(21) Appl. No.: 13/867,161

(22) Filed: Apr. 22, 2013

(65) Prior Publication Data

US 2013/0293929 A1 Nov. 7, 2013

(30) Foreign Application Priority Data

May 7, 2012 (JP) ................................ 2012-106314

(51) Int. Cl.
*H04N 1/00* (2006.01)
*H04N 1/12* (2006.01)

(52) U.S. Cl.
CPC ......... *H04N 1/00005* (2013.01); *H04N 1/0005* (2013.01); *H04N 1/00063* (2013.01); *H04N 1/00068* (2013.01); *H04N 1/00082* (2013.01); *H04N 1/00233* (2013.01); *H04N 1/00578* (2013.01); *H04N 1/0058* (2013.01); *H04N 1/12* (2013.01); *H04N 2201/044* (2013.01); *H04N 2201/0091* (2013.01); *H04N 2201/0082* (2013.01)

USPC ......... 358/3.24; 358/1.14; 358/1.15; 358/1.9; 358/3.27; 399/27

(58) Field of Classification Search
USPC ............... 358/1.8, 1.9, 3.13, 3.16, 3.18, 3.24, 358/1.14, 1.15, 3.27; 399/27
See application file for complete search history.

(56) References Cited

U.S. PATENT DOCUMENTS

| | | | | |
|---|---|---|---|---|
| 2004/0156047 A1* | 8/2004 | Nakayama | ..................... | 356/300 |
| 2005/0025506 A1* | 2/2005 | Adachi | ............................ | 399/27 |
| 2009/0003851 A1* | 1/2009 | Nishi | .............................. | 399/27 |
| 2009/0273798 A1* | 11/2009 | Igarashi | ......................... | 358/1.9 |
| 2011/0222128 A1* | 9/2011 | Wada | ........................... | 358/3.27 |
| 2013/0279951 A1* | 10/2013 | Bucks | ........................... | 399/285 |

FOREIGN PATENT DOCUMENTS

JP 2000-185881 A 7/2000

\* cited by examiner

*Primary Examiner* — Allen H Nguyen
(74) *Attorney, Agent, or Firm* — Carter, DeLuca, Farrell & Schmidt, LLP

(57) ABSTRACT

In an image forming apparatus and a control method thereof according to this invention, in a case that a received print job designates image formation on a surface of a sheet on which an image has been formed, whether image formation on the sheet based on the print job is possible is determined based on at least image information of the sheet acquired by reading the image of the sheet. If it is determined that image formation on the sheet based on the print job is impossible, the image formation on the sheet is stopped. If it is determined that the image formation on the sheet based on the print job is possible, an image is formed on the sheet in accordance with the image information of the print job.

14 Claims, 26 Drawing Sheets

F I G. 1
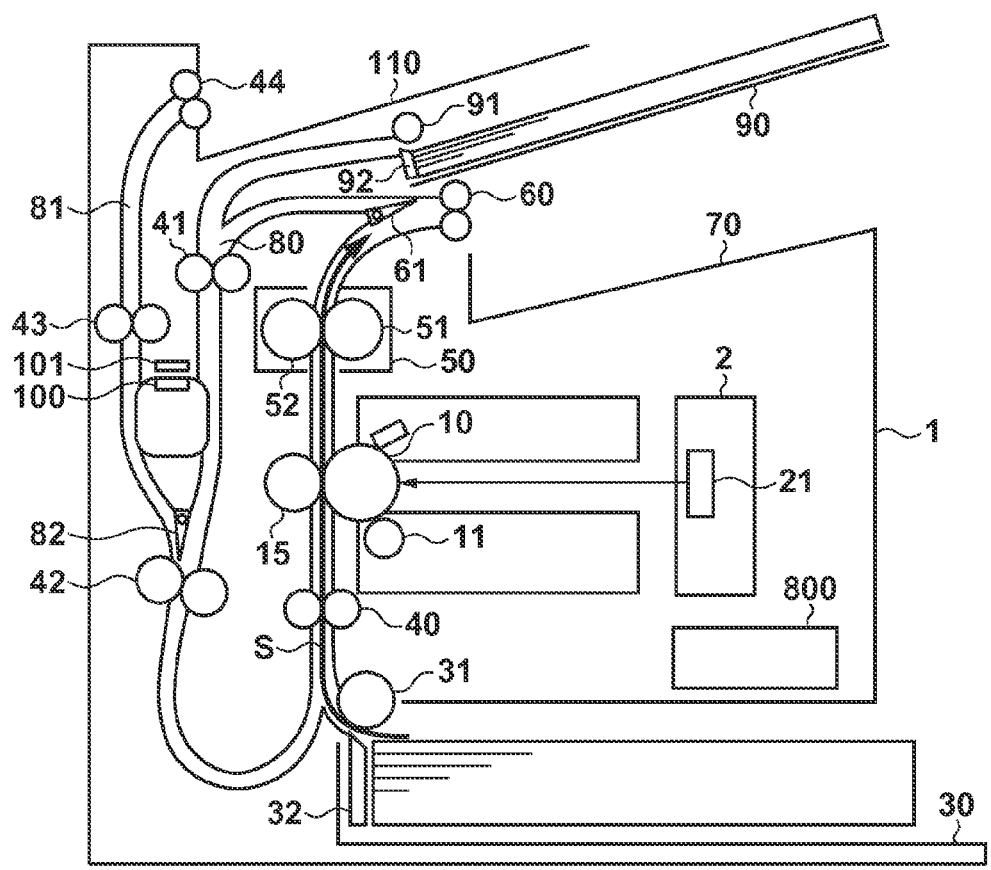

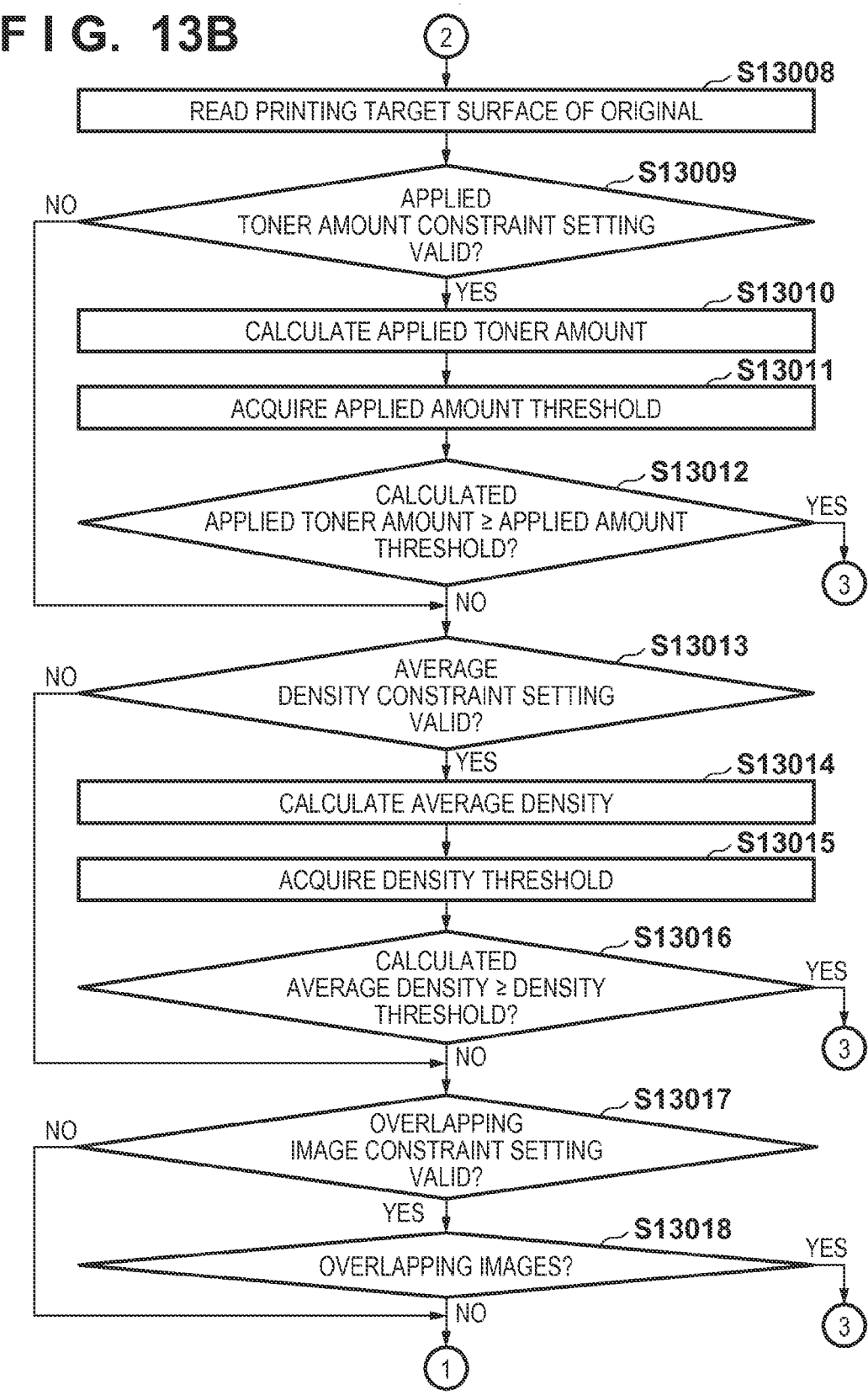

F I G. 14

READ ORIGINAL OVERWRITE CONSTRAINT SETTINGS

APPLIED TONER AMOUNT CONSTRAINT SETTING    14004

14002 — ● VALID    APPLIED AMOUNT THRESHOLD : [ 100 ]
  14003 — ○ INVALID

AVERAGE DENSITY CONSTRAINT SETTING    14007

14005 — ● VALID    AVERAGE DENSITY THRESHOLD : [ 80 ]
  14006 — ○ INVALID

OVERLAPPING IMAGE CONSTRAINT SETTING

14008 — ● VALID
  14009 — ○ INVALID

[ OK ]                                   [ Cancel ]
 14010                                    14011

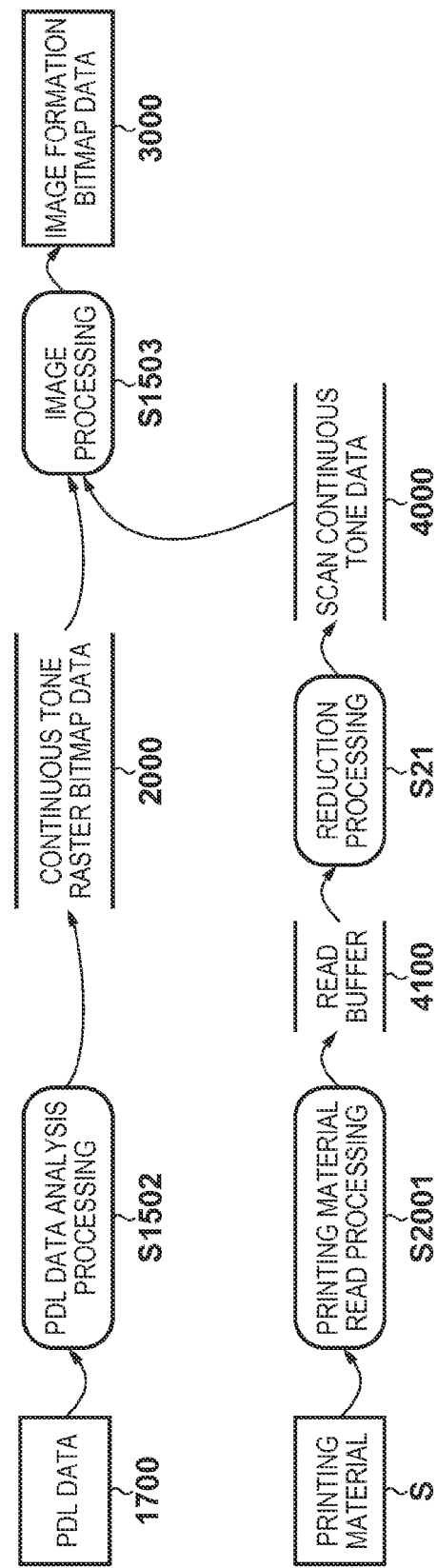

IMAGE FORMING APPARATUS, CONTROL METHOD AND STORAGE MEDIUM FOR DESIGNATING IMAGE FORMATION ON A SHEET

BACKGROUND OF THE INVENTION

1. Field of the Invention

The present invention relates to an image forming apparatus, method of controlling the same, and a storage medium.

2. Description of the Related Art

Conventionally, in an image forming apparatus which reads an original to generate image data, and prints an image on paper based on the image data, an original feed path for conveying an original, and a feed path for conveying a printing material such as print paper are configured independently. While reading an original, the image forming apparatus executes processing of printing an image on a printing material.

In Japanese Patent Laid-Open No. 2000-185881, a reading unit is inserted in a printing material feed path extending from a feeding unit to a discharge unit, thereby partially sharing the original feed path and printing material feed path and downsizing the apparatus.

If the original feed path and printing material feed path are partially shared to be able to convey an original to a printing unit, after the reading unit reads an original (printed material) to acquire image information of the original, printing can be performed on the original.

Some originals have already undergone printing on one or two surfaces. An example of such an original is an original on which a predetermined form has already been printed.

Printing an image on such an original is additional overwrite printing in a region which has already been printed using toner. If the total amount of toner applied to the original becomes excessively large, the toner cannot be appropriately fixed, making the printed contents blur. To prevent this, a user needs to recognize print data and the contents printed on an original to be printed, predict a final amount of applied toner, and determine whether printing will be performed with an image quality the user wants. However, this is difficult. The prediction becomes more difficult if the user does not know the type of paper set in the feeding unit of an image forming apparatus at the transmission destination when transmitting a print job from an external apparatus.

SUMMARY OF THE INVENTION

An aspect of the present invention is to eliminate the above-mentioned problems which are found in the conventional technology.

A feature of the present invention is to provide a technique that prevents printed contents from blurring after image formation when an image is formed on an original on which an image has already been formed.

According to an aspect of the present invention, there is provided an image forming apparatus comprising: a reading unit configured to read an image of a sheet to acquire image information of the sheet; a reception unit configured to receive a print job including image information from an external apparatus; a determination unit configured to, in a case that the print job designates image formation on a surface of the sheet on which the image has been formed, determine, based on at least the image information of the sheet, whether the image formation on the sheet based on the print job is possible; and a control unit configured to, in a case that the determination unit determines that the image formation on the sheet based on the print job is impossible, stop image formation on the sheet, and in a case that the determination unit determines that the image formation on the sheet based on the print job is possible, form an image on the sheet in accordance with the image information of the print job.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 depicts a conceptual view for explaining a state in which a toner image is transferred and fixed to a sheet S conveyed from a first feeding unit in an image forming apparatus according to a first embodiment of the present invention;

FIGS. 13A and 13B are flowcharts for describing processing of receiving and printing a print job by the image forming apparatus according to the first embodiment;

FIG. 14 depicts a view exemplifying a read original overwrite constraint setting screen according to the first embodiment;

FIG. 25 depicts a view for explaining an image processing sequence in an image forming apparatus according to a fourth embodiment.

DESCRIPTION OF THE EMBODIMENTS

Figure 2:
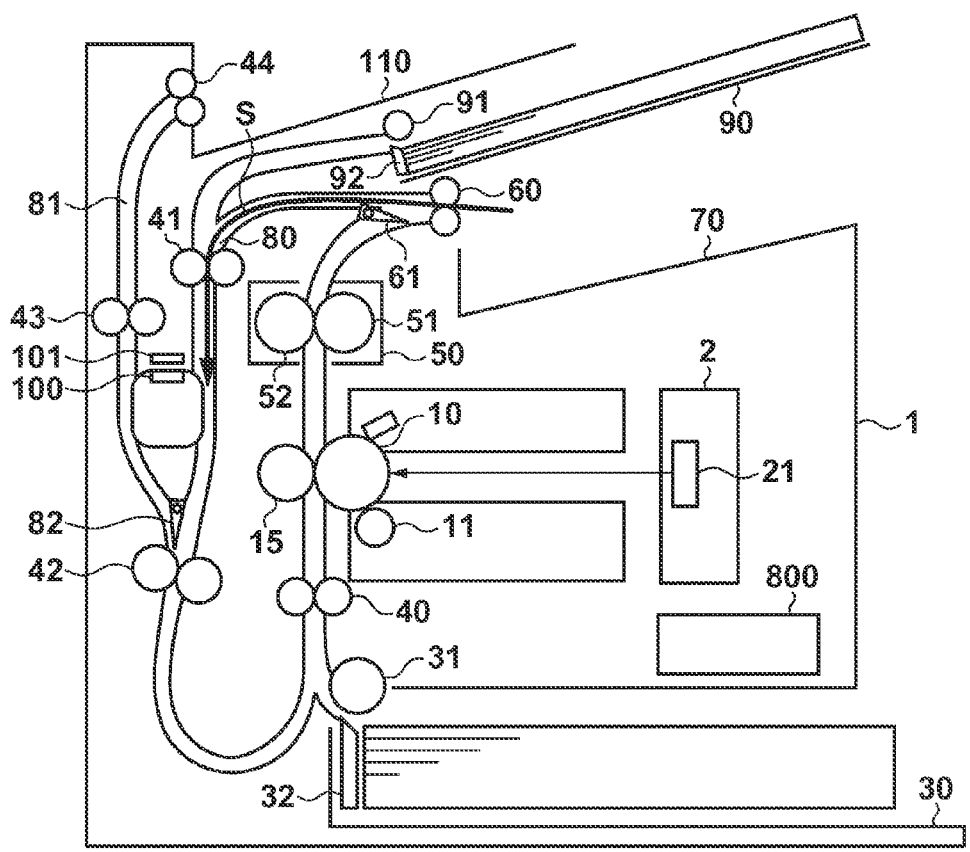
FIG. 2 depicts a view for explaining a state in which, after the toner image is transferred and fixed to the sheet S conveyed from the first feeding unit, it is conveyed for double-sided printing in the image forming apparatus according to the first embodiment.

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

FIG. 1 depicts a conceptual view for explaining a state in which a toner image is transferred and fixed to a printing material (sheet) S conveyed from a first feeding unit in an image forming apparatus according to the first embodiment of the present invention.

A rotatable photosensitive drum 10 serving as an image carrier, and a developing roller 11 which is juxtaposed with the photosensitive drum 10 and rotates while holding toner are arranged at the center of an image forming apparatus 1. Upon receiving a print signal, a light emitting unit 21 of an optical unit 2 emits a laser beam corresponding to the print signal to the surface of the rotating photosensitive drum 10. A latent image is formed by charges on the surface of the photosensitive drum 10 irradiated with the laser beam. While rotating, the developing roller 11 supplies the toner to the latent image on the surface of the photosensitive drum 10. Then, the toner image corresponding to the electrostatic latent image is formed on the surface of the photosensitive drum 10.

Sheets S stacked on a first feeding unit 30 are separated by a pickup roller 31 and separator 32, and conveyed one by one to conveyance rollers 40. The conveyance rollers 40 convey the sheet S to a transfer unit 15 so that formation of the toner image onto the surface of the photosensitive drum 10 and the arrival timing of the leading edge position of the sheet S coincide with each other.

The toner image on the photosensitive drum 10 is transferred to the sheet S by an application bias and pressure applied by the transfer unit 15. Further, the transfer unit 15 conveys the sheet S to a fixing unit 50. In the fixing unit 50, the toner image is fixed to the sheet S by heat from a rotatable heating roller 51, and the pressure of a rotatable pressing roller 52 facing the heating roller 51. The sheet S on which the toner image is fixed is conveyed to the position of discharge rollers 60. For single-sided printing, the discharge rollers 60 directly convey the sheet S outside the apparatus 1, and the sheet S is stacked on a first discharge unit 70. Note that an electronic unit 800 to be described later with reference to FIG. 8 controls the operation of the overall image forming apparatus 1.

FIG. 2 depicts a view for explaining a state in which, after the toner image is transferred and fixed to the sheet S conveyed from the first feeding unit, it is conveyed for double-sided printing in the image forming apparatus according to the first embodiment. In FIG. 2, the same reference numerals as those in FIG. 1 denote the same parts.

A double-sided flapper 61 switches the feed path after the trailing edge of the sheet S passes through it. Then, the discharge rollers 60 rotate reversely to convey the sheet S to a double-sided feed path (first feed path) 80. The switched-back sheet S is conveyed to an image reading unit 100 via conveyance rollers 41. Then, the sheet S is conveyed to conveyance rollers 42 and the conveyance rollers 40, and conveyed again to the transfer unit 15. After a toner image is transferred and fixed, the sheet S is discharged to the first discharge unit 70 and stacked on it.

A process to execute reading of an original and double-sided printing on a sheet will be explained.

Figure 3:
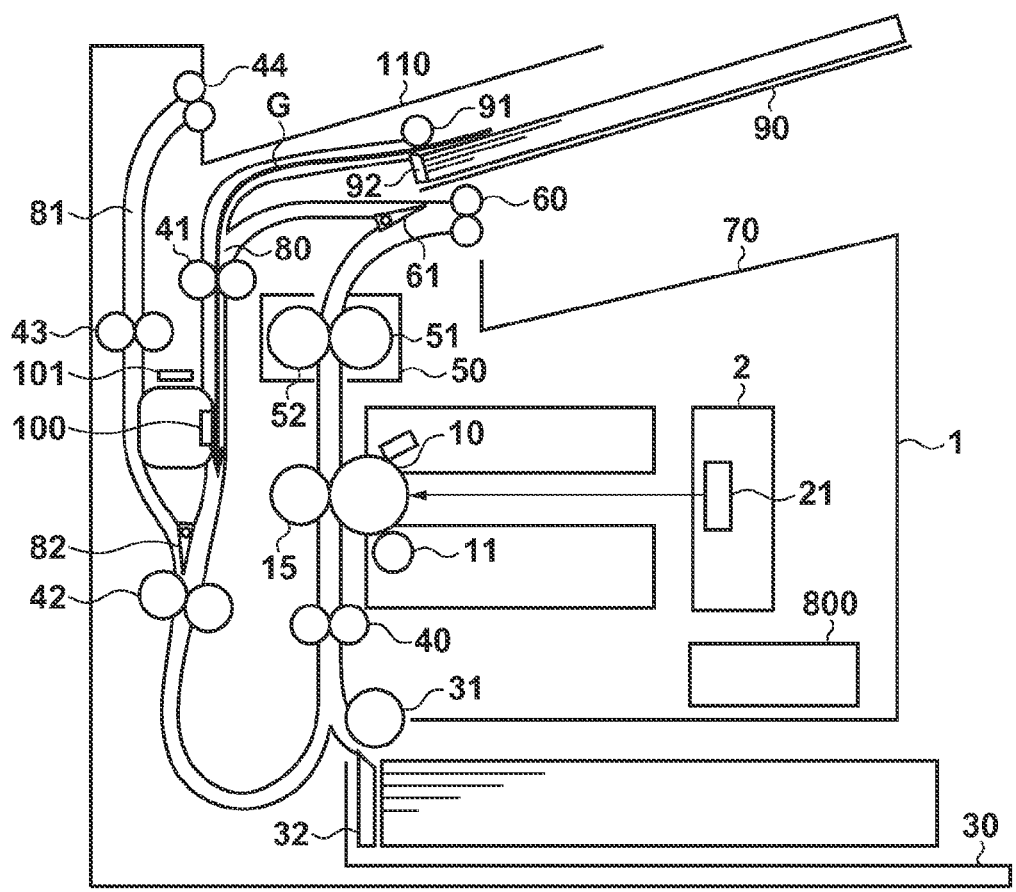
FIG. 3 depicts a view for explaining an original feed path when an image reading unit reads an original conveyed from a second feeding unit in the image forming apparatus according to the first embodiment.

FIG. 3 depicts a view for explaining an original feed path when the image reading unit 100 reads an original conveyed from a second feeding unit in the image forming apparatus according to the first embodiment. In FIG. 3, the same reference numerals as those in FIGS. 1 and 2 denote the same parts.

Originals G stacked on a second feeding unit 90 are conveyed one by one by a pickup roller 91 and separator 92 to the conveyance rollers 41. The image reading unit 100 executes emission to a white reference member 101 and correction of the white reference value till the start of reading the first surface serving as the obverse surface of the original G fed from the second feeding unit 90. Then, the image reading unit 100 rotates to a position where it faces the double-sided feed path 80. When the original G is conveyed to the position of the image reading unit 100 by rotation of the conveyance rollers 41, it is read by the image reading unit 100 because the image reading unit 100 already stands by at the position where it faces the double-sided feed path 80. The read information is stored as image information of the first surface of the original in an image memory 804 to be described in detail later with reference to FIG. 8. Note that the white reference member 101 faces down to prevent attachment of dust.

Figure 4:
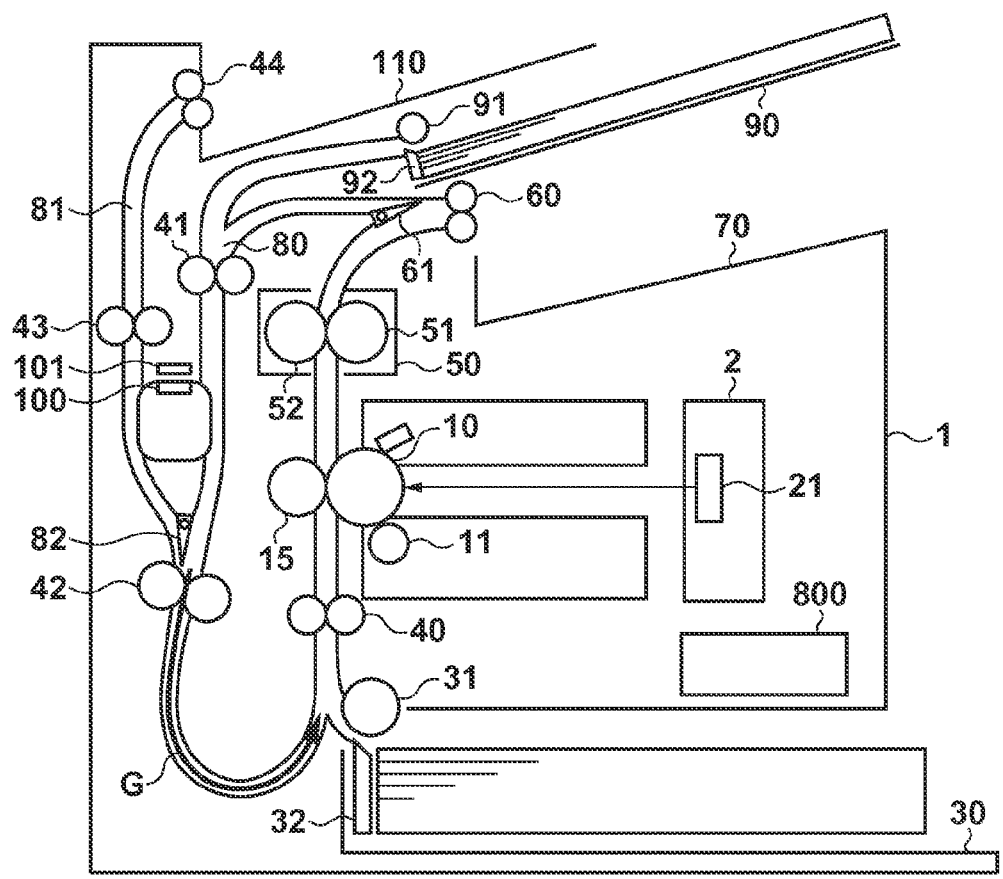
FIG. 4 depicts a view for explaining conveyance of the original after reading the first surface serving as the obverse surface of the original in the image forming apparatus according to the first embodiment.

FIG. 4 depicts a view for explaining conveyance of the original after reading the first surface serving as the obverse surface of the original in the image forming apparatus according to the first embodiment. In FIG. 4, the same reference numerals as those in the above-described drawings denote the same parts.

The original G having passed through the image reading unit 100 is conveyed by rotation of the conveyance rollers 42. The rotation of the conveyance rollers 42 stops after the trailing edge of the original G passes through a switchback flapper 82. The original G stops while being clamped by the conveyance rollers 42. After the lapse of a predetermined time period, the original G is conveyed to an original dedicated feed path (second feed path) 81.

Figure 5:
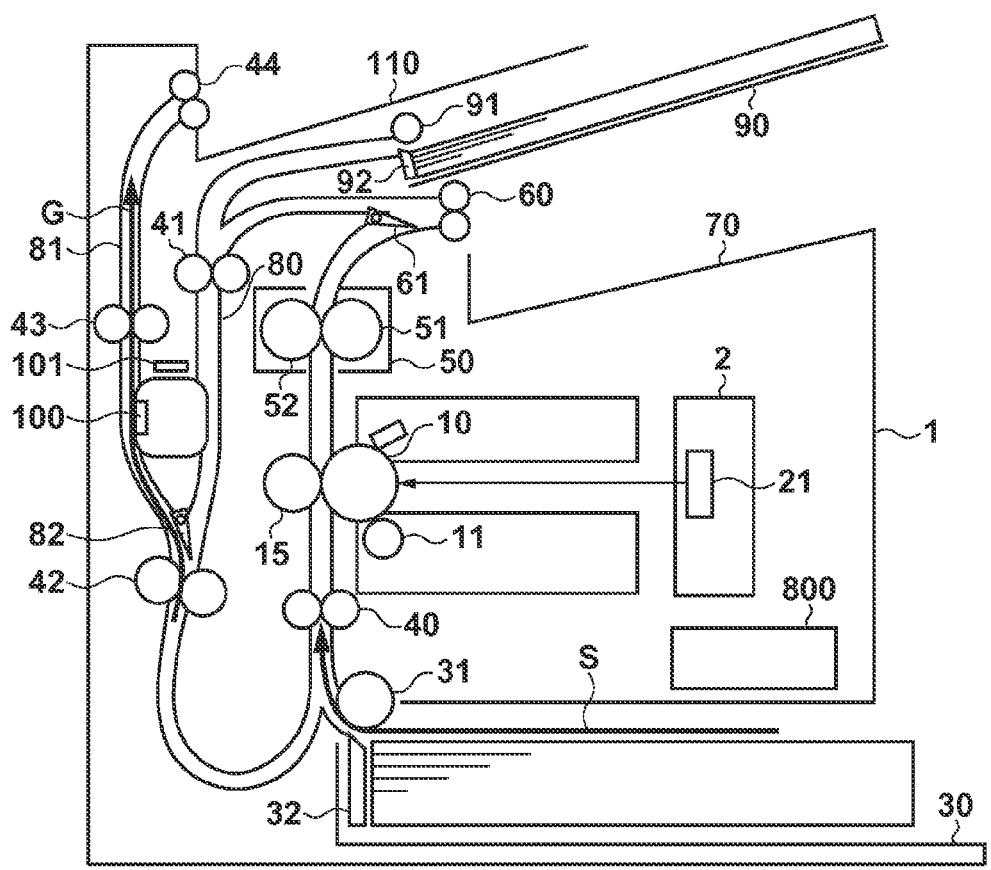
FIG. 5 depicts a view for explaining conveyance of the original when reading the second surface serving as the reverse surface of the original in the image forming apparatus according to the first embodiment.

FIG. 5 depicts a view for explaining conveyance of the original when reading the second surface serving as the reverse surface of the original in the image forming apparatus according to the first embodiment. In FIG. 5, the same reference numerals as those in the above-described drawings denote the same parts.

Simultaneously when the switchback flapper 82 switches the feed path from the double-sided feed path 80 to the original dedicated feed path 81, the image reading unit 100 rotates to the position where it faces the original dedicated feed path 81. When the conveyance rollers 42 rotate reversely, the original G is conveyed to the position of the image reading unit 100 along the original dedicated feed path 81. When the original G is conveyed and passes through the image reading unit 100, the image reading unit 100 reads information of the second surface serving as the reverse surface of the original. The image data is stored as image information of the second surface of the original in the image memory 804.

At this time, the sheets S fed from the first feeding unit 30 are conveyed one by one to the conveyance rollers 40. In parallel to this, the light emitting unit 21 emits a laser beam based on the image information of the second surface serving as the reverse surface of the original that is stored in the image memory 804, thereby forming a latent image corresponding to the image of the reverse surface of the original on the photosensitive drum 10. After the transfer unit 15 transfers, to the sheet S, a toner image formed based on the latent image, the sheet S passes through the fixing unit 50 and the like, completing the formation of the image of the second surface of the original on the sheet S.

In FIG. 5, feeding of the sheet S starts at the same time as the start of reading the image of the second surface serving as the reverse surface of the original. However, conveyance of the sheet S may start after reading information of the second surface of the original.

Figure 6:
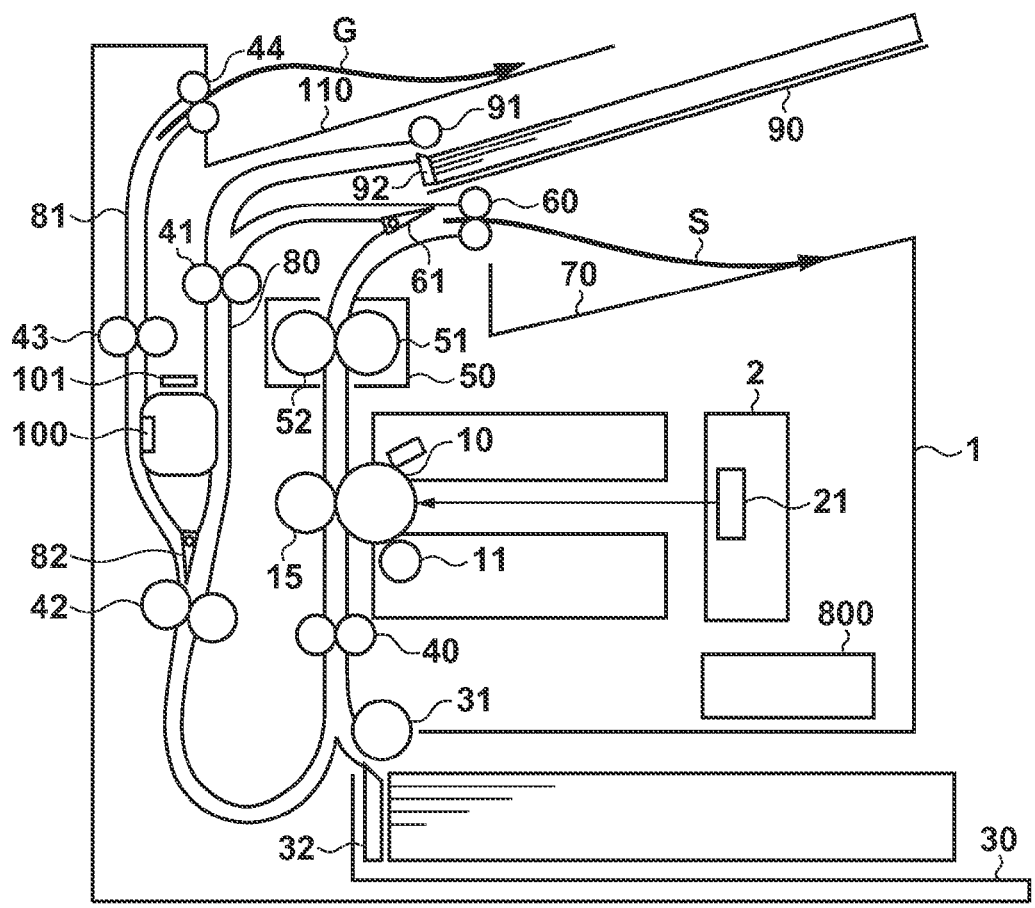
FIG. 6 depicts a view for explaining conveyance of the original and sheet after reading the reverse surface of the original in the image forming apparatus according to the first embodiment.

FIG. 6 depicts a view for explaining conveyance of the original and sheet after reading the reverse surface of the original in the image forming apparatus according to the first embodiment. In FIG. 6, the same reference numerals as those in the above-described drawings denote the same parts.

The read original G is conveyed by conveyance rollers 43 and 44, discharged to a second discharge unit 110, and stacked on it. After the trailing edge of the original G passes through the switchback flapper 82, the switchback flapper 82 switches the feed path from the original dedicated feed path 81 to the double-sided feed path 80 in order to convey the sheet S toward the conveyance rollers 40. The sheet S having undergone image formation of the second surface (reverse surface) of the original is conveyed by reverse rotation of the discharge rollers 60 toward the double-sided feed path 80 switched by the double-sided flapper 61.

Figure 7:
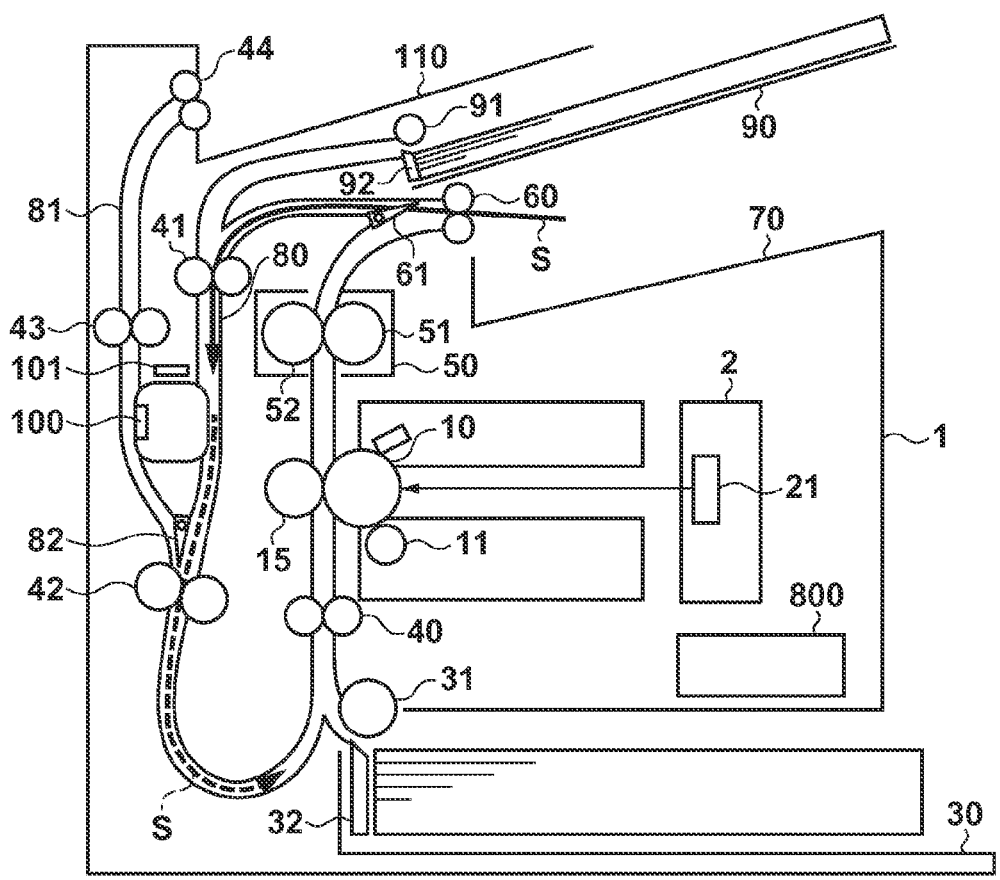
FIG. 7 depicts a view for explaining conveyance of the sheet after forming the image of the reverse surface of the original on the sheet S in the image forming apparatus according to the first embodiment.

FIG. 7 depicts a view for explaining conveyance of the sheet after forming the image of the reverse surface of the original on the sheet S in the image forming apparatus according to the first embodiment.

The sheet S conveyed to the double-sided feed path 80 passes through the reversed image reading unit 100, and is conveyed to the position of the conveyance rollers 40 via the conveyance rollers 42. Further, the sheet S is conveyed again to the transfer unit 15, as indicated by a broken line. At the time, image formation of the second surface of the original has already ended on the sheet S. Hence, based on the image information of the first surface (obverse surface) of the original stored in the image memory 804, the image of the first surface of the original is formed on the other surface of the sheet S by the optical unit 2, photosensitive drum 10, developing roller 11, transfer unit 15, and fixing unit 50. The sheet S on which the images of the two surfaces of the original are formed on two surfaces is discharged to the first discharge unit 70 and stacked on it. As described above, the image forming apparatus 1 according to the first embodiment allows partially sharing the feed path for the original G and the feed path for the sheet S. The image forming apparatus 1 can read the images of the two surfaces of the original G, and print them on the two surfaces of the sheet S. More specifically, a feed path for reading the first surface of the original G, and a feed path for performing double-sided printing on the sheet S are shared. This can downsize the apparatus.

Figure 8:
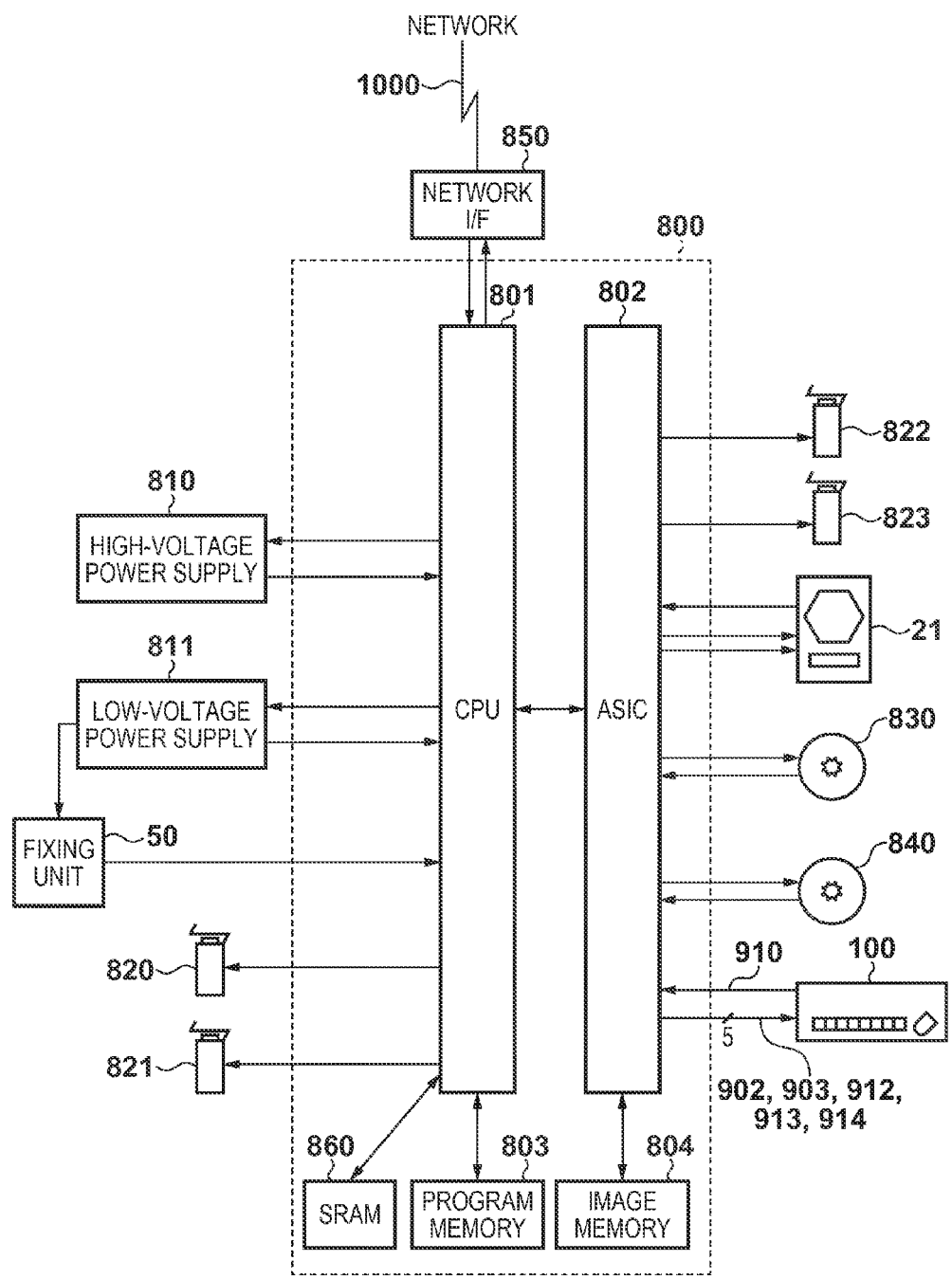
FIG. 8 is a block diagram for explaining connection between the building components of the electronic unit of the image forming apparatus and mechanical units according to the first embodiment.

FIG. 8 is a block diagram for explaining connection between the building components of the electronic unit 800 of the image forming apparatus 1 and mechanical units according to the first embodiment. FIG. 8 shows respective units to be controlled by a CPU 801.

In FIG. 8, the CPU 801 is connected via an ASIC (Application Specific Integrated Circuit) 802 to the light emission unit 21 including a polygon mirror, motor, laser emitting element, and the like. The CPU 801 outputs a control signal to the ASIC 802 to control the optical unit 2 in order to draw a desired latent image by scanning the surface of the photosensitive drum 10 with a laser beam. Similarly, the CPU 801 drives a main motor 830 for driving the pickup roller 31, conveyance rollers 40, photosensitive drum 10, transfer unit 15, heating roller 51, and pressing roller 52 in order to convey the sheet S. Also, the CPU 801 drives a feeding solenoid 822 which is turned on at the start of driving a feeding roller for feeding the sheet S, and drives the pickup roller 31, and a double-sided driving motor 840 for driving the pickup roller 91 and conveyance rollers 41.

Further, the CPU 801 controls a high-voltage power supply 810 which controls a primary charge bias, developing bias, primary transfer bias, and secondary transfer bias necessary for an electrophotographic process, the fixing unit 50, and a low-voltage power supply 811. The CPU 801 monitors a temperature by using a thermistor (not shown) arranged in the fixing unit 50, and controls to keep the fixing temperature constant. The CPU 801 is connected to a program memory 803 via a bus (not shown). The program memory 803 stores programs and data for executing all or some processes to be performed by the CPU 801 in embodiments. That is, the CPU 801 executes operations according to the embodiments of the present invention by using programs and data stored in the program memory 803. Note that the program memory 803 stores temporary calculation results and the like necessary to perform processing by the CPU 801.

The ASIC 802 controls the motor speed of the light emitting unit 21 and the rotational speeds of the main motor 830 and double-sided driving motor 840 based on instructions from the CPU 801. In the motor rotational speed control, a tachometer signal (pulse signal output from a motor every time the motor rotates) from a motor (not shown) is detected, and an acceleration or deceleration signal is output to the motor so that the interval between tachometer signals becomes a predetermined time. Forming the control circuit from a hardware circuit, like the ASIC 802, can reduce the control load on the CPU 801.

Upon receiving a print command from a host computer (not shown), the CPU 801 conveys the sheet S by driving the main motor 830, double-sided driving motor 840, and feeding solenoid 822. The transfer unit 15 transfers, to the sheet S, a toner image formed on the surface of the photosensitive drum 10, and the fixing unit 50 fixes the toner image. Then, the sheet S is discharged to the first discharge unit 70 by the discharge rollers 60. To align image-formed sheets, the first discharge unit 70 has a gentle up slope formed from the vicinity of the discharge port in the sheet discharge direction. The CPU 801 supplies predetermined power to the fixing unit 50 via the low-voltage power supply 811 to generate a desired amount of heat, and supplies the heat to the sheet S to fuse and fix the toner image on the sheet S.

An operation to read the original G according to the first embodiment will be explained.

Upon receiving a scan command from the host computer, the CPU 801 operates a feeding solenoid 823 by driving a double-sided flapper solenoid 820 and the double-sided driving motor 840. The torque of the double-sided driving motor 840 is transmitted to the pickup roller 91, starting conveyance of the original G. The image reading unit 100 is connected to the ASIC 802 by using various control signals CISLED, CIS-START, SYSCLK, Sl_in, Sl_select, and Sl_out (to be described later). The CPU 801 saves, in the image memory 804 connected to the ASIC 802, image data obtained by the image reading unit 100 in various control operations via the ASIC 802. After that, the CPU 801 operates a switchback solenoid 821 to switch the switchback flapper 82 to the original dedicated feed path 81, reversely rotate the double-sided driving motor 840, and convey the original G to the second discharge unit 110.

Next, a communication operation in the first embodiment will be explained.

The CPU 801 inputs and outputs image information and device information by connection to a network 1000 via a network interface 850.

Figure 9:
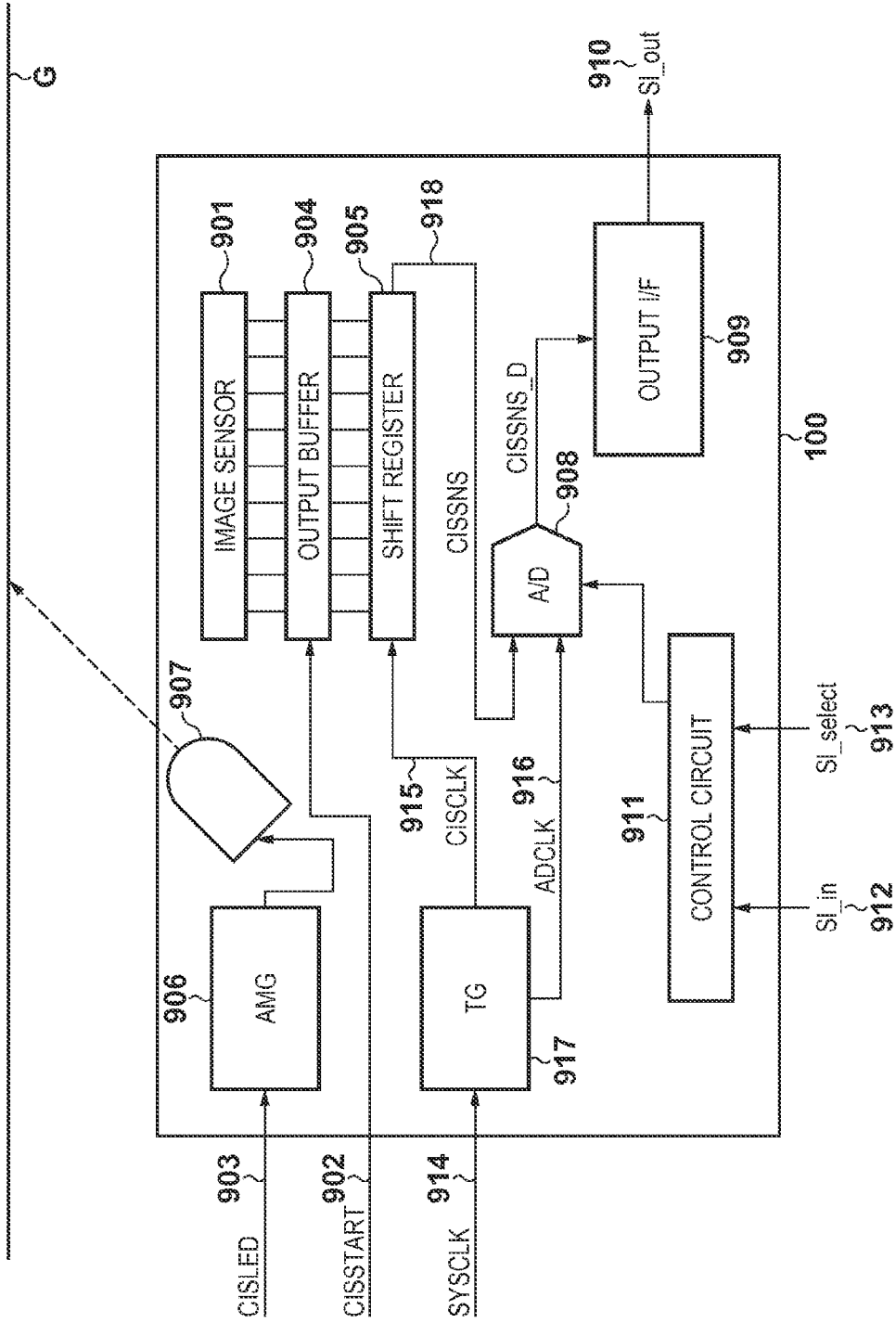
FIG. 9 is a block diagram for explaining the arrangement of the image reading unit according to the first embodiment.

FIG. 9 is a block diagram for explaining the arrangement of the image reading unit 100 according to the first embodiment.

In FIG. 9, reference numeral 901 denotes a contact image sensor (CIS) in which photodiodes for, for example, 10,368 pixels are arrayed at a specific main scanning density (for example, 1,200 dpi). A start pulse CISSTART signal 902 and transfer clock CISCLK 915 are supplied to the CIS sensor 901. A system clock SYSCLK 914 determines the operating speed of the CIS sensor 901. Reference numeral 908 denotes an A/D converter. A CIS sampling clock ADCLK 916 decides the sampling rate of the A/D converter 908. Reference numeral 917 denotes a timing generator; reference numeral 904 denotes an output buffer; reference numeral 905 denotes a shift register; reference numeral 903 denotes a light-emitting element control signal; and reference numeral 906 denotes a current amplifier. A light-emitting element 907 uniformly irradiates the original G.

Next, an operation will be explained.

When the CISSTART signal 902 becomes active, the CIS sensor 901 starts accumulating charges based on received light, and sequentially sets data in the output buffer 904. Then, the transfer clock CISCLK 915 (for example, about 500 kHz to 1 MHz) is supplied, and the shift register 905 transfers the data set in the output buffer 904 as a CISSNS signal 918 to the A/D converter 908. The CISSNS signal 918 has a predetermined data assurance area, and thus needs to be sampled a predetermined time after the leading edge of the transfer clock CISCLK 915. The CISSNS signal 918 is output in synchronism with both the leading and trailing edges of the transfer clock CISCLK 915. Hence, the frequency of the CIS sampling clock ADCLK 916 is double the frequency of the transfer clock CISCLK 915. The CISSNS signal 918 is sampled at the leading edge of the CIS sampling clock ADCLK 916. The timing generator 917 divides the frequency of the system clock SYSCLK 914, generating the CIS sampling clock ADCLK 916 and transfer clock CISCLK 915. The phase of the CIS sampling clock ADCLK 916 is delayed from that of the transfer clock CISCLK 915 by the data assurance area.

The CISSNS signal converted into a digital signal by the A/D converter 908 is controlled by an output interface circuit 909 at a predetermined timing and output as an Sl_out signal 910 by serial data. At this time, an analog output reference voltage is output for the CISSNS signal 918 corresponding to a predetermined number of pixels from the start pulse CIS-START 902, and these pixels cannot be used as effective pixels.

A control circuit 911 can variably control the A/D conversion gain of the A/D converter 908 in accordance with an Sl_in signal 912 and Sl_select signal 913. For example, when the contrast of a captured image cannot be obtained, the CPU 801 increases the A/D conversion gain of the A/D converter 908 to increase the contrast, and an image can always be captured with a best contrast.

A case in which all pixels are output as one output CISSNS signal 918 has been described. However, pixels may be divided into respective areas for high-speed reading, and pixel data of a plurality of areas may be A/D-converted at the same time. The image reading unit 100 uses the CIS sensor in the above description, but may use a CMOS sensor, CCD sensor, or the like.

Next, processing of transmitting a print job from the printer driver of an external apparatus such as a PC to the image forming apparatus in the first embodiment will be explained with reference to FIGS. 10, 11, and 12.

Figure 10:
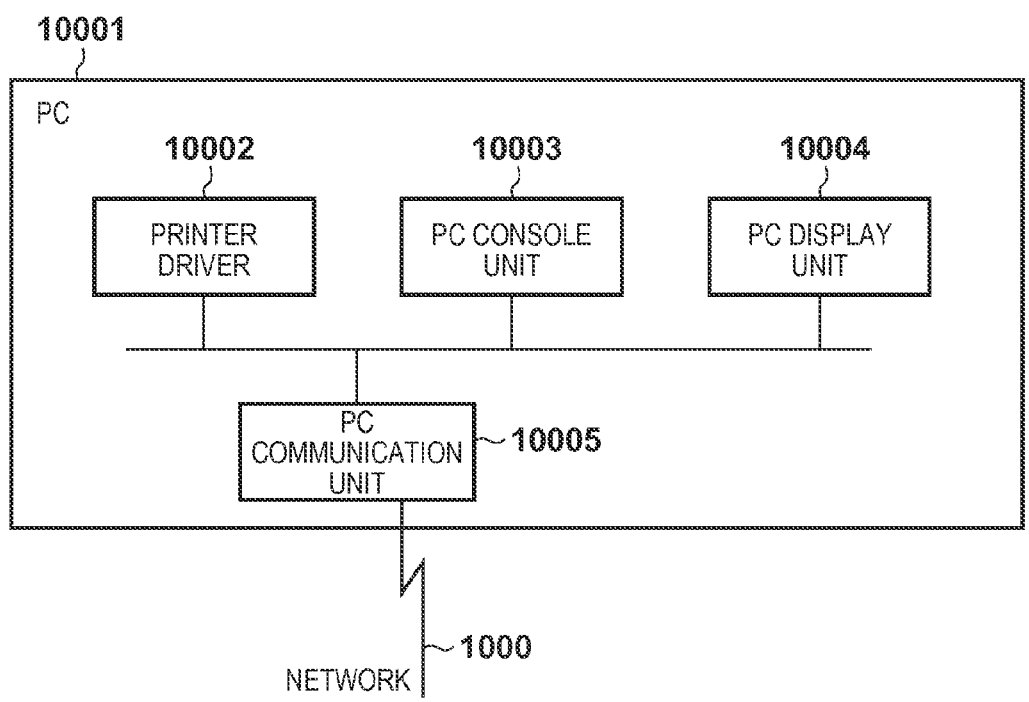
FIG. 10 is a block diagram showing the schematic functional arrangement of a PC serving as an external apparatus according to the first embodiment.

FIG. 10 is a block diagram showing the schematic functional arrangement of a PC 10001 serving as an external apparatus according to the first embodiment. Assume that the PC 10001 and image forming apparatus 1 are connected via the network 1000, and a printer driver 10002 corresponding to the image forming apparatus 1 is installed in the PC 10001.

Figure 11:
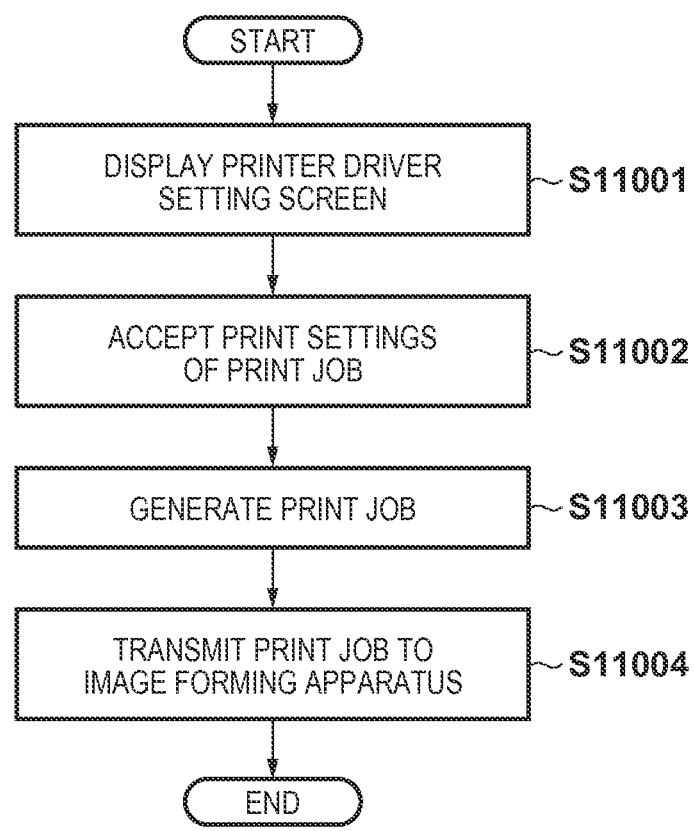
FIG. 11 is a flowchart for describing a processing sequence to input a print job from the PC to the image forming apparatus according to the first embodiment.

FIG. 11 is a flowchart for describing a processing sequence to input a print job from the PC 10001 to the image forming apparatus 1 according to the first embodiment.

Figure 12:
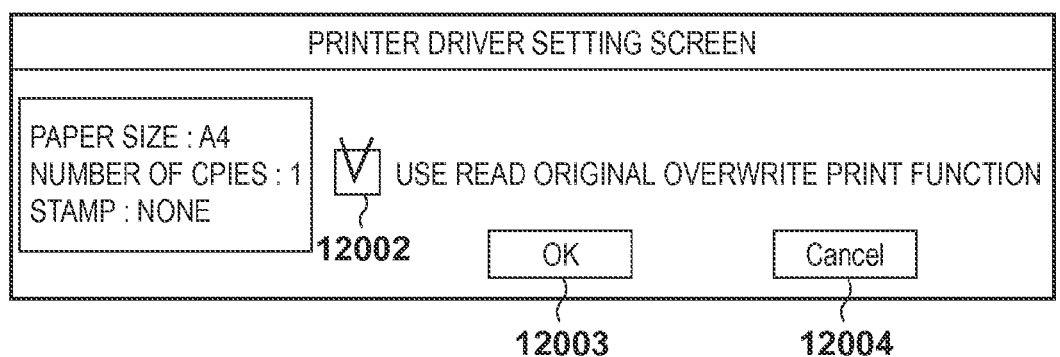
FIG. 12 depicts a view exemplifying a printer driver setting screen displayed by the printer driver of the PC according to the first embodiment.

FIG. 12 depicts a view exemplifying a printer driver setting screen displayed by the printer driver of the PC according to the first embodiment. A PC display unit 10004 displays the printer driver setting screen.

The flowchart of FIG. 11 will be explained with reference to FIGS. 10 and 12.

First, in step S11001, a PC console unit 10003 receives a printer driver setting screen display instruction from the user, and displays a printer driver setting screen as shown in FIG. 12 on the PC display unit 10004. The printer driver setting screen of FIG. 12 enables settings pertaining to a print job.

In the first embodiment, a function of receiving a print job from the PC 10001 by the image forming apparatus 1, reading an original in the feeding unit before the start of printing, and then printing on the original will be called a "read original overwrite function". A setting representing whether the read original overwrite function is valid/invalid will be called a "read original overwrite print setting". The read original overwrite print setting, and settings pertaining to printing such as the paper size and the number of copies can be made on the printer driver setting screen of FIG. 12. Although the embodiment describes a sheet as an original when reading the sheet serving as a printing target, the original and sheet are identical here.

Then, the process advances to step S11002, and the PC console unit 10003 receives an operation by the user on the printer driver setting screen and makes settings pertaining to the print job. When the user wants to validate the read original overwrite print setting, the user selects a read original overwrite print setting button 12002 on the printer driver setting screen from the PC console unit 10003, and checks it. FIG. 12 shows an example in which the read original overwrite print setting button 12002 is checked to validate the read original overwrite function. Upon completion of the setting, the user presses an OK button 12003. Note that a cancel button 12004 is pressed to cancel the setting.

The printer driver setting screen according to the first embodiment enables settings pertaining to printing such as the paper size, print copies, and print color, in addition to validation/invalidation of the read original overwrite print setting. In the first embodiment, all these settings will be called print settings. In the first embodiment, one read original overwrite print setting can be made for even an entire print job including a plurality of pages as image information, but the present invention is not limited to this. That is, the read original overwrite print setting may be made for each page of a print job.

The process advances to step S11003, and the printer driver 10002 generates a print job based on the print settings received in step S11002. At this time, if the read original overwrite print setting button 12002 is checked to validate the read original overwrite print setting, a print job having the read original overwrite print setting is generated.

The process advances to step S11004, and the printer driver 10002 transmits the print job to the image forming apparatus 1 via a PC communication unit 10005.

The processing sequence to input a print job by the user from the printer driver 10002 of the PC 10001 has been described.

Next, print processing by the image forming apparatus 1 according to the first embodiment will be explained with reference to FIGS. 8, 13A, 13B, and 14.

Figure 13A:
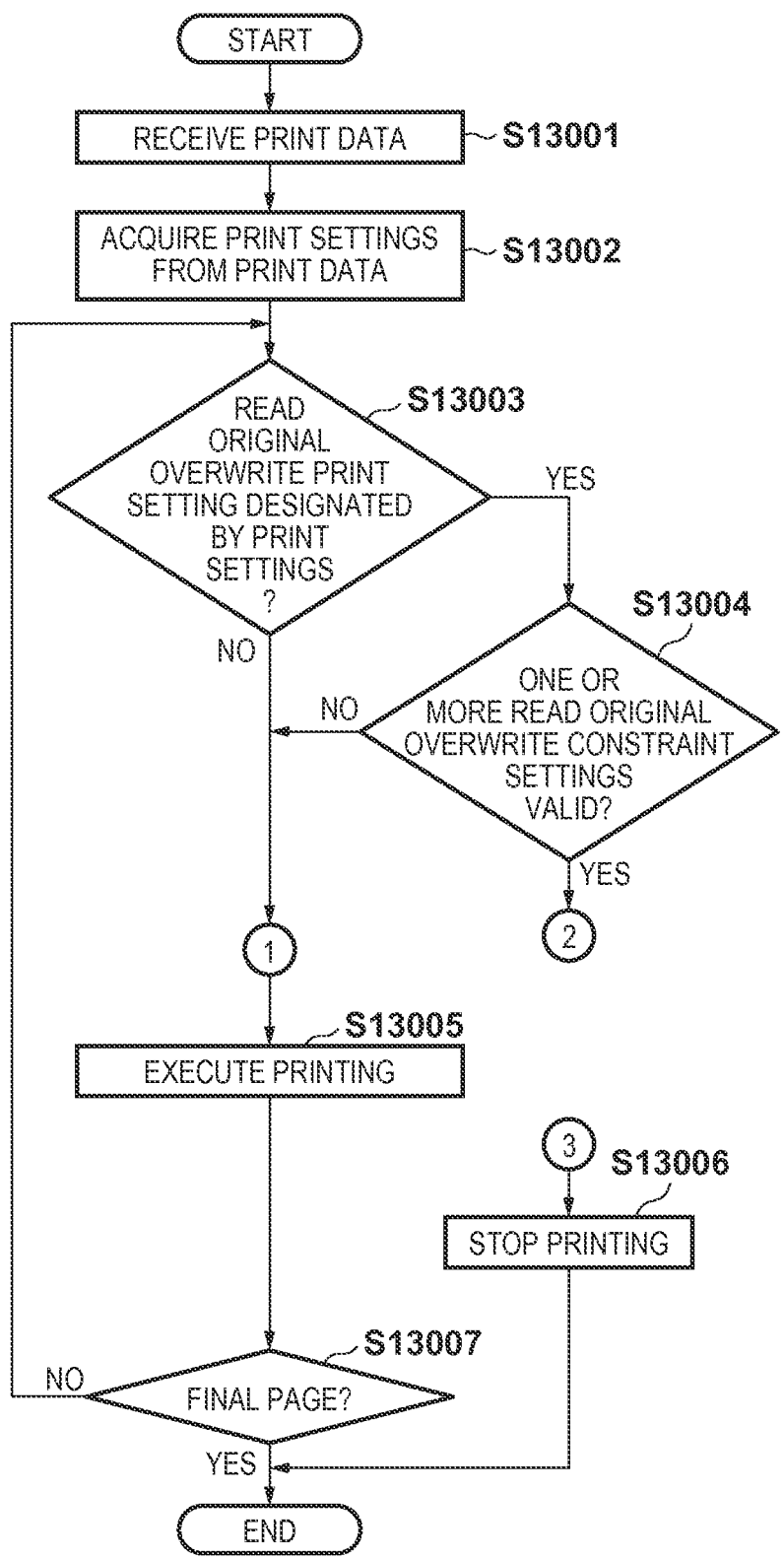

FIGS. 13A and 13B are flowcharts for describing processing of receiving and printing a print job by the image forming apparatus 1 according to the first embodiment.

The electronic unit 800 shown in FIG. 8 in the image forming apparatus 1 controls processing of the image forming apparatus 1 according to the first embodiment. The electronic unit 800 includes the CPU 801, the ASIC 802, the program memory 803, an SRAM 860, and the like in the image forming apparatus 1. Note that procedures represented by the flowcharts of FIGS. 13A and 13B are stored in either the program memory 803 or SRAM 860, and the CPU 801 executes the control program, thereby executing the control represented by the flowchart.

First, in step S13001, the CPU 801 receives a print job transmitted from the PC communication unit 10005 via the network interface 850, and saves the received print job in the image memory 804. Then, the process advances to step S13002, and the CPU 801 acquires the print settings of the received print job. In step S13003, the CPU 801 determines whether the acquired print settings designate the read original overwrite print setting. If the CPU 801 determines that the print settings do not designate the read original overwrite print setting, the process advances to step S13005, and the CPU 801 executes printing for the current page of the print job. The process then advances to step S13007, and the CPU 801 determines whether printing of the final page has ended. If printing of the final page has not ended, the process returns to step S13003 to execute the above-described processing. After the end of printing the final page, the process ends.

If the CPU 801 determines in step S13003 that the acquired print settings designate the read original overwrite print setting, the process advances to step S13004. In step S13004, the CPU 801 acquires read original overwrite constraint settings held in the SRAM 860, and determines whether one or more read original overwrite constraint settings become valid.

FIG. 14 depicts a view exemplifying a read original overwrite constraint setting screen according to the first embodiment.

The CPU 801 provides the read original overwrite constraint setting screen as a service of a remote UI (User Interface) in the image forming apparatus 1 via the network interface 850. The PC display unit 10004 displays the read original overwrite constraint setting screen, and the PC console unit 10003 accepts an operation. The image forming apparatus 1 according to the first embodiment is assumed not to have a rich local UI such as a large-screen liquid crystal display, so the remote UI is exemplified. However, the UI is not limited to this, and a local UI is also available.

The read original overwrite constraint setting screen in FIG. 14 allows setting constraint conditions when executing the overwrite function in the image forming apparatus 1. In the first embodiment, three types of settings "applied toner amount constraint setting", "average density constraint setting", and "overlapping image constraint setting" can be independently set as settings having constraint conditions. In the first embodiment, all these constraint settings will be called "read original overwrite constraint settings".

Note that the three types can be set here, but this is merely an example. For example, in another image forming apparatus, only one type of constraint condition such as "applied toner amount constraint setting" may be settable. Alternatively, these settings may be internally validated/invalidated in the image forming apparatus 1 so that they cannot be made via the user interface. The settings of the respective constraint conditions in executing the read original overwrite print function will be explained.

The applied toner amount constraint setting is a setting of determining whether an amount of toner applied to an original to be printed is equal to or larger than a threshold. This constraint can be validated or invalidated using an applied toner amount constraint setting validation button 14002 and invalidation button 14003. An applied toner amount threshold setting button 14004 is used to set an "applied amount threshold" which defines the upper limit of an amount of applied toner for printing. The applied toner amount threshold can be set only when the applied toner amount constraint setting validation button 14002 is set to validate the applied toner amount constraint setting.

The applied toner amount in the first embodiment is a transferred toner amount estimated on an original after overwrite printing, and is defined by setting, as 0%, a blank state in which no toner is transferred, and a maximum toner density value as 100% when the image forming apparatus 1 transfers toner. A transferred toner amount estimated on an original after overwrite printing is expressed by the sum of the toner amount of an original image which has already been printed, and the toner amount of an image to be transferred based on image information designated by a print job. Assume that the maximum density value is held as profile data by measuring in advance an amount of applied toner when the densities of C, M, Y, and K toners used in the image forming apparatus 1 are each 100%. However, the applied toner amount maximum value calculation method, and the applied amount threshold designation method are not particularly limited. For example, toner thresholds may be set for C, M, Y, and K, or R, G, and B, respectively. FIG. 14 exemplifies a screen in which the applied toner amount constraint setting validation button 14002 is set and the applied amount threshold is set to 100%.

The average density constraint setting is a setting of determining whether the average density of image information read from an original to be overwritten is equal to or larger than a threshold. This constraint can be validated or invalidated using an average density constraint setting validation button 14005 and invalidation button 14006. An average density threshold setting button 14007 is used to set an "average density threshold" which defines the upper limit of the average density of image information read from an original. The average density threshold can be set only when the average density constraint setting validation button 14005 is set to validate the average density constraint setting.

The average density in the first embodiment is a density per unit area before overwrite printing on an original surface to be overwritten. In the first embodiment, the CPU 801 performs grayscale conversion for pixel information output from the image reading unit 100. A value which exhibits a lowest density and corresponds to white in the pixel is defined as 0, and a value which exhibits a highest density and corresponds to black is defined as 100. However, this is not particularly limited. For example, pixel information output from the image reading unit 100 is converted into RGB or CMYK information, a table which links the color information and density information is prepared, and density information per unit area is calculated. However, the density information is not particularly limited. FIG. 14 exemplifies a screen in which the average density constraint setting validation button 14005 is set and the average density threshold is set to 80.

The overlapping image constraint setting is a setting of determining whether there is a portion where pieces of image information overlap each other per unit area when image information transmitted by a print job is overwritten on image information present on an original surface to be overwritten. The overlapping image constraint setting can be validated or invalidated using an overlapping image constraint setting validation button 14008 and invalidation button 14009. FIG. 14 exemplifies a screen in which the overlapping image constraint setting validation button 14008 is set.

When the user presses an OK button 14010 upon completion of setting the respective set values, the CPU 801 stores these set values in the SRAM 860. A cancel button 14011 is used to cancel these settings.

The read original overwrite constraint settings are made by the administrator of the image forming apparatus 1 in the first embodiment, but the present invention is not limited to this. For example, each user which prints using the image forming apparatus 1 may individually make these settings.

Referring back to the description of the flowchart of FIGS. 13A and 13B, if the CPU 801 determines in step S13004 that all the read original overwrite constraint settings acquired from the SRAM 860 are invalid, the process advances to step S13005, and the CPU 801 executes printing for the current page of the print job. Then, the process advances to step S13007.

If the CPU 801 determines in step S13004 that one or more read original overwrite constraint settings acquired from the SRAM 860 are valid, the process advances to step S13008 (FIG. 13B). In this case, the CPU 801 feeds an original stored in the second feeding unit 90 to the original dedicated feed path 81, and the image reading unit 100 reads an original surface to be printed (FIG. 3). Image information of the read original is held in the image memory 804 and managed by the CPU 801. Thereafter, the process advances to step S13009, and the CPU 801 acquires the applied toner amount constraint setting from the SRAM 860 and determines whether the applied toner amount constraint setting is valid. If the CPU 801 determines in step S13009 that the applied toner amount constraint setting is invalid, the process advances to step S13013. If the CPU 801 determines in step S13009 that the applied toner amount constraint setting is valid, the process advances to step S13010. In step S13010, the CPU 801 calculates an amount of applied toner to be transferred to the original when performing overwrite printing on the original.

Calculation of an amount of applied toner by the CPU 801 in the first embodiment will be exemplified.

The CPU 801 acquires image information of the print job held in the image memory 804, and image information of an original to be overwritten that has been read by the reading unit 100. Then, the CPU 801 composites these two pieces of image information, estimates color information and density information in each pixel based on profile data which has been measured in advance and held, and calculates an amount of applied toner after printing. The CPU 801 divides the composited image information into unit areas, selects, as a calculation result in step S13010, a value having a largest applied toner amount per unit area, and holds it in the program memory 803.

The unit area in the first embodiment is a region formed from the number of pixels corresponding to, for example, a 5-mm square of an original to be printed. This unit area is assumed as a size at which a shift of printing does not matter when the user sees a printed original. However, this does not limit the present invention. The decision of the unit area may be selected by a user such as the administrator of the image forming apparatus 1.

After that, the process advances to step S13011, and the CPU 801 acquires, from the SRAM 860, the applied amount threshold set by the applied toner amount threshold setting. The process advances to step S13012, and the CPU 801 determines whether the applied toner amount calculated in step S13010 is equal to or larger than the applied amount threshold acquired in step S13011. If the CPU 801 determines that the applied toner amount is smaller than the applied amount threshold, the process advances to step S13013. If the CPU 801 determines that the applied toner amount is equal to or larger than the applied amount threshold, the process advances to step S13006 (FIG. 13A), and the CPU 801 stops printing of the current page of the print job. The print processing then ends.

By this processing, before overwrite printing on an original image in accordance with a print job, an original surface on which the original image has been printed is read, and an amount of applied toner after printing is calculated in advance from image information of the read surface and image information of the print job. If the amount of applied toner becomes equal to or larger than the applied amount threshold, overwrite printing on the original is stopped. This can prevent a situation in which the total amount of applied toner becomes large, the toner cannot be fixed appropriately on the original, and the printed contents blur.

In the first embodiment, the CPU 801 stops the processing of the entire print job in step S13006 so that the user can easily recognize a page, printing of which has been suspended. At this time, it may be determined whether to print the next page included in the print job. In this case, the process shifts to step S13007 after step S13006. However, when a large number of originals have been printed, the user takes time to grasp a page at which printing has stopped halfway. For this reason, when printing of even one page is stopped, the entire print job is stopped in the first embodiment.

In step S13013, the CPU 801 acquires the average density constraint setting from the SRAM 860, and determines whether the average density constraint setting is valid. If the CPU 801 determines in step S13013 that the average density constraint setting is invalid, the process advances to step S13017. If the CPU 801 determines that the average density constraint setting is valid, the process advances to step S13014. In step S13014, the CPU 801 calculates an average density from image information read from an original to be overwritten.

Calculation of an average density by the CPU 801 in the first embodiment will be exemplified.

The CPU 801 acquires, from the image memory 804, image information of an original read by the image reading unit 100. The CPU 801 performs grayscale conversion for the image information. The CPU 801 divides the image information into unit areas, and calculates the average value of a pixel density per unit area. The CPU 801 selects, as a calculation result in step S13014, the average density of a region having a highest density out of average densities per unit area, and holds it in the program memory 803. The unit area in the first embodiment is the same as the region for the applied toner amount constraint setting described above. However, the region is not particularly limited, similar to that for the applied toner amount constraint setting.

After that, the process advances to step S13015, and the CPU 801 acquires, from the SRAM 860, an average density threshold set with the average density threshold setting button 14007. The process advances to step S13016, and the CPU 801 determines whether the average density calculated in step S13014 is equal to or higher than the average density threshold acquired in step S13015. If the CPU 801 determines in step S13016 that the average density is lower than the average density threshold, the process advances to step S13017. If the CPU 801 determines that the average density is equal to or higher than the average density threshold, the process advances to step S13006 (FIG. 13A), and the CPU 801 stops printing for the current page of the print job. The print processing then ends.

By the above-described processing, before overwrite printing on an original image in accordance with a print job, an original surface on which the original image has been printed is read, average density information of the image information is calculated, and whether overwrite printing is possible can be determined. Printing is stopped for an original having an average density higher than the average density threshold. This can prevent a situation in which an amount of toner applied to an original becomes large and the printed contents blur. The average density is used because determination can be made from only image information of a read original and processing can be performed more quickly than by a method using an amount of applied toner. The average density constraint setting can be combined with the applied toner amount constraint setting and overlapping image constraint setting. The combination of them is assumed to be used when the user wants to prevent generation of a printing error more strictly.

Thereafter, the process advances to step S13017, and the CPU 801 acquires the overlapping image constraint setting from the SRAM 860 and determines whether the overlapping image constraint setting is valid. If the CPU 801 determines in step S13017 that the overlapping image constraint setting is invalid, the process advances to step S13005 (FIG. 13A) to execute printing. If the CPU 801 determines in step S13017 that the overlapping image constraint setting is valid, the process advances to step S13018. In step S13018, the CPU 801 determines whether there is a portion (overlapping images) where pieces of image information overlap each other when image information transmitted from the print job is overwritten and printed on an image present on an original surface to undergo overwrite printing.

Calculation of overlapping images by the CPU 801 in the first embodiment will be exemplified.

The CPU 801 acquires image information of the print job held in the image memory 804, and image information of an original to undergo overwrite printing that has been read by the reading unit 100. The CPU 801 divides each of these two pieces of image information into unit areas. The CPU 801 compares the divided corresponding regions, and determines whether density information exists in both the regions. If there is even one region including density information in both the regions, the CPU 801 determines that pieces of image information overlap each other in this unit area. If both the regions do not include density information, the CPU 801 determines that image information of the print job and the image printed on the original do not overlap each other.

If the CPU 801 determines in step S13018 that image information of the original to undergo overwrite printing and the image information transmitted from the print job do not overlap each other, the process advances to step S13005. In the above processing, the CPU 801 performs conveyance of an original fed from the second feeding unit 90 in parallel to the processes in steps S13005 to S13018. The original is conveyed up to the photosensitive drum 10 through the paths shown in FIGS. 3 and 4. In step S13005, the CPU 801 prints an image based on image information on the original by using the photosensitive drum 10, transfer unit 15, and the like. The CPU 801 discharges the image-printed original to the first discharge unit 70.

If the CPU 801 determines in step S13018 that there are overlapping images, the process advances to step S13006 (FIG. 13A), and the CPU 801 stops printing for the current page of the print job. The print processing then ends.

By the above-described processing, before overwrite printing on an original in accordance with a print job, it is determined whether there are overlapping images in image information of the original and image information of the print job. If there are overlapping images, printing is stopped, and generation of a printing error can be prevented. Determination of the presence/absence of overlapping images assumes a user's intention that the user does not want to print an image on an original portion where toner has already been transferred. The overlapping image constraint setting can be combined with the applied toner amount constraint setting and average density constraint setting. The combination of them is assumed to be used when the user wants to prevent generation of a printing error more strictly.

As described above, before the image forming apparatus performs, in accordance with a print job, overwrite printing on an original on which an image has already been formed, it can read the original surface and determine, from the read image information and image information of the print job, whether overwrite printing is possible. Only when the image forming apparatus determines that overwrite printing is possible, it performs the overwrite printing on the original. When the image forming apparatus determines that overwrite printing is impossible, it stops printing and can prevent generation of a printing error.

Second Embodiment

The second embodiment of the present invention will be described. Note that the arrangement of an image forming apparatus 1, and the like according to the second embodiment are the same as those in the first embodiment, and a description thereof will not be repeated.

Before a description of details of processing by the image forming apparatus 1 according to the second embodiment, an outline of print processing by the image forming apparatus 1 will be explained with reference to FIG. 15. The second embodiment will also explain a case in which data based on a print job is printed on an original (sheet) S on which an image has already been printed.

Figure 15:
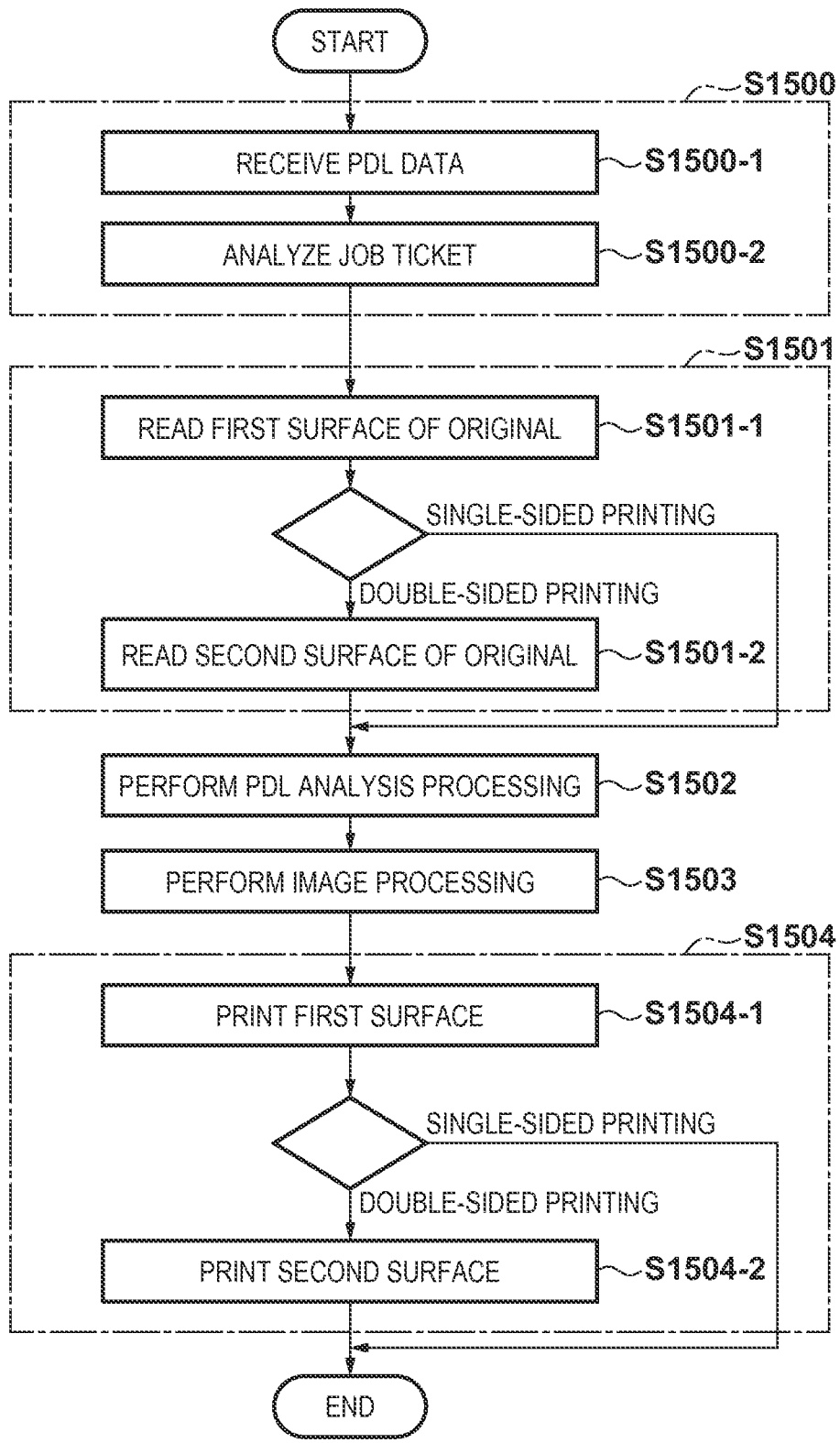
FIG. 15 is a flowchart for describing a processing sequence to receive and print PDL data by an image forming apparatus according to a second embodiment of the present invention.

FIG. 15 is a flowchart for describing a processing sequence to receive and print PDL data by the image forming apparatus according to the second embodiment of the present invention.

First, in step S1500, the image forming apparatus 1 receives PDL data from a PC (a PC 4 in FIG. 16), and prepares for print processing based on the PDL data. In this preparation, an image processor (to be described later) receives the PDL data in step S1500-1, and interprets a job ticket of the PDL data in step S1500-2. As a result, the image forming apparatus 1 can decide at least which of double-sided printing and single-sided printing should be performed for the PDL data. The image forming apparatus 1 may perform another processing pertaining to print settings in step S1500-2. For example, in step S1500-2, the image forming apparatus 1 may decide the print resolution.

After the processing, the image forming apparatus 1 performs original image read processing in step S1501. In step S1501-1, the image forming apparatus 1 reads the image of the first surface of the original. If single-sided printing is to be performed, the process advances to step S1502. If double-sided printing is to be performed, the process advances to step S1501-2 to read the second surface of the original. In step S1502, the image forming apparatus 1 performs PDL data analysis processing. Further, in step S1503, the image forming apparatus 1 performs image processing based on the reading result of the original image read processing in step S1501 and the PDL data analysis processing in step S1502. By this image processing, the image forming apparatus 1 performs processing of restricting an amount of toner applied to the original (to be described later). The process advances to step S1504, and the image forming apparatus 1 performs print processing on the original based on the result of the image processing in step S1503. In the print processing of step S1504, the image forming apparatus 1 prints on the first surface of the original in step S1504-1. If single-sided printing is to be performed, printing ends. If double-sided printing is to be performed, the image forming apparatus 1 prints on the second surface of the original in step S1504-2.

Figure 16:
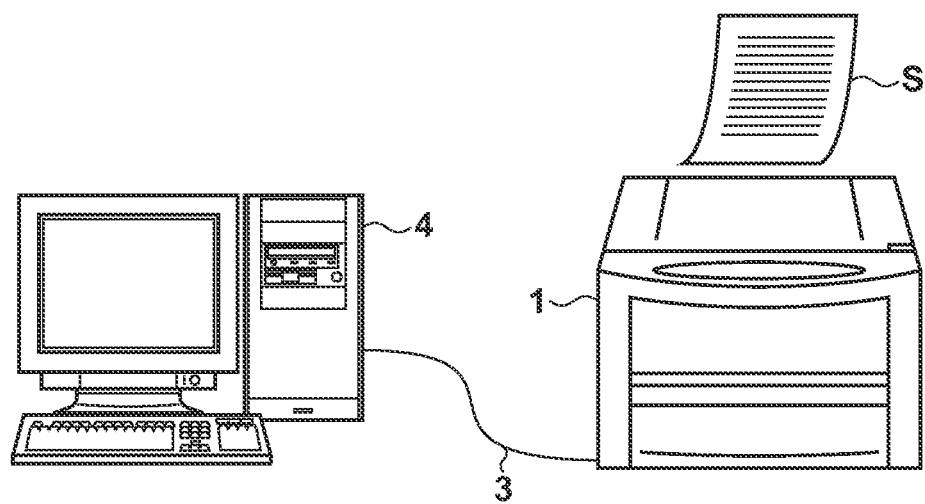
FIG. 16 depicts a view for explaining a connection form between a PC serving as an external apparatus and an image forming apparatus according to the second embodiment.

FIG. 16 depicts a view for explaining a connection between a PC serving as an external apparatus and the image forming apparatus 1 according to the second embodiment. This connection is also applicable to the first embodiment described above.

The host computer 4 typified by a PC (Personal Computer) operates an application, middleware, and driver software to generate PDL data to be transmitted to the image forming apparatus 1. The host computer 4 and image forming apparatus 1 are connected to each other by a communication means typified by a network 3. The host computer (PC) 4 transfers the PDL data to the image forming apparatus 1 via the network 3.

Note that the network 3 is arbitrarily a USB interface, IEEE1284 interface, or network apparatus to be described later.

The image forming apparatus 1 forms a visible image on a sheet (or original) typified by paper in accordance with the PDL data obtained via the network 3. The processing of forming a visible image on a sheet (or original) is generally called printing.

The second embodiment exemplifies the image forming apparatus 1 with the multi function. However, the image forming apparatus 1 may be a printer connected to a scanner.

Figure 17:
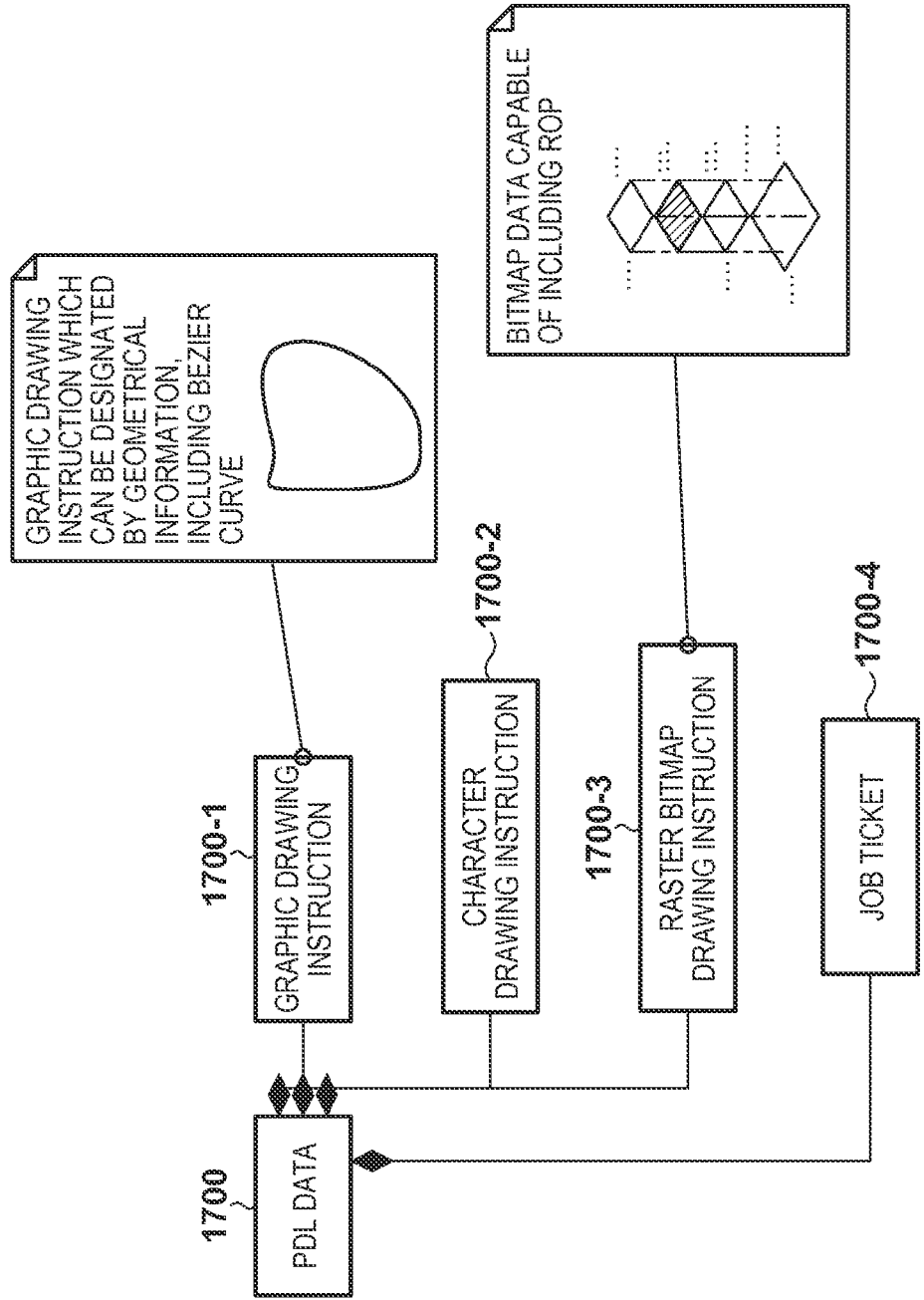
FIG. 17 depicts a view for explaining the structure of PDL data according to the second embodiment.

FIG. 17 depicts a view for explaining the structure of PDL data according to the second embodiment.

PDL data 1700 includes one or more PDL commands to be described below. More specifically, the PDL data includes a graphic drawing instruction 1700-1, character drawing instruction 1700-2, raster bitmap drawing instruction 1700-3, and job ticket 1700-4. The graphic drawing instruction 1700-1 is an instruction to draw a graphic which can be designated by geometrical information. The geometrical information which can be held by the PDL data 1700 includes a line segment on a two-dimensional plane, and a straight line expressible by a set of line segments. Further, the geometrical information includes a curve expressible by a blending function, typified by a Bezier curve on a two-dimensional plane, a closed curve by a set including line segments and curves mentioned above, and color information in the closed curve. Instead of a Bezier curve on a two-dimensional plane, another curve expression method such as a spline curve may be used. By exemplifying these pieces of geometrical information, the second embodiment explains geometrical information which can be held by the PDL data 1700. However, the PDL data 1700 may not have some pieces of geometrical information.

The character drawing instruction 1700-2 is an instruction to draw a designated character. The raster bitmap drawing instruction 1700-3 is a drawing instruction to draw a two-dimensional array having discrete color information. The raster bitmap drawing instruction 1700-3 can hold overlay information called ROP (Raster Operation) information. Needless to say, the PDL data 1700 may hold another instruction. The job ticket 1700-4 is setting information representing how to perform print processing by the image forming apparatus 1 which prints the PDL data 1700. For example, the job ticket 1700-4 can hold information representing which of double-sided printing and single-sided printing should be performed by the image forming apparatus 1. Although the instructions which should be held by the PDL data 1700 have been explained, the PDL data 1700 may hold another instruction.

The PDL data 1700 is converted into continuous tone bitmap data serving as two-dimensional raster bitmap data having a depth of 8 bits for single black (to be referred to as K hereinafter) by processing to be described later. Alternatively, the PDL data 1700 is converted into continuous tone bitmap data serving as two-dimensional raster bitmap data of four, cyan, magenta, yellow, and black (to be referred to as C, M, Y, and K, respectively) each having a depth of 8 bits. Details of this processing and data will be described later.

Although the second embodiment explains continuous tone bitmap data as 8-bit data of single K, the continuous tone bitmap suffices to be another two-dimensional raster bitmap data of continuous tones. For example, the continuous tone bitmap data may be 8-bit data of each of R, G, and B, or 8-bit data of each of a combination of two colors such as M and K (Magenta and black).

Figure 18:
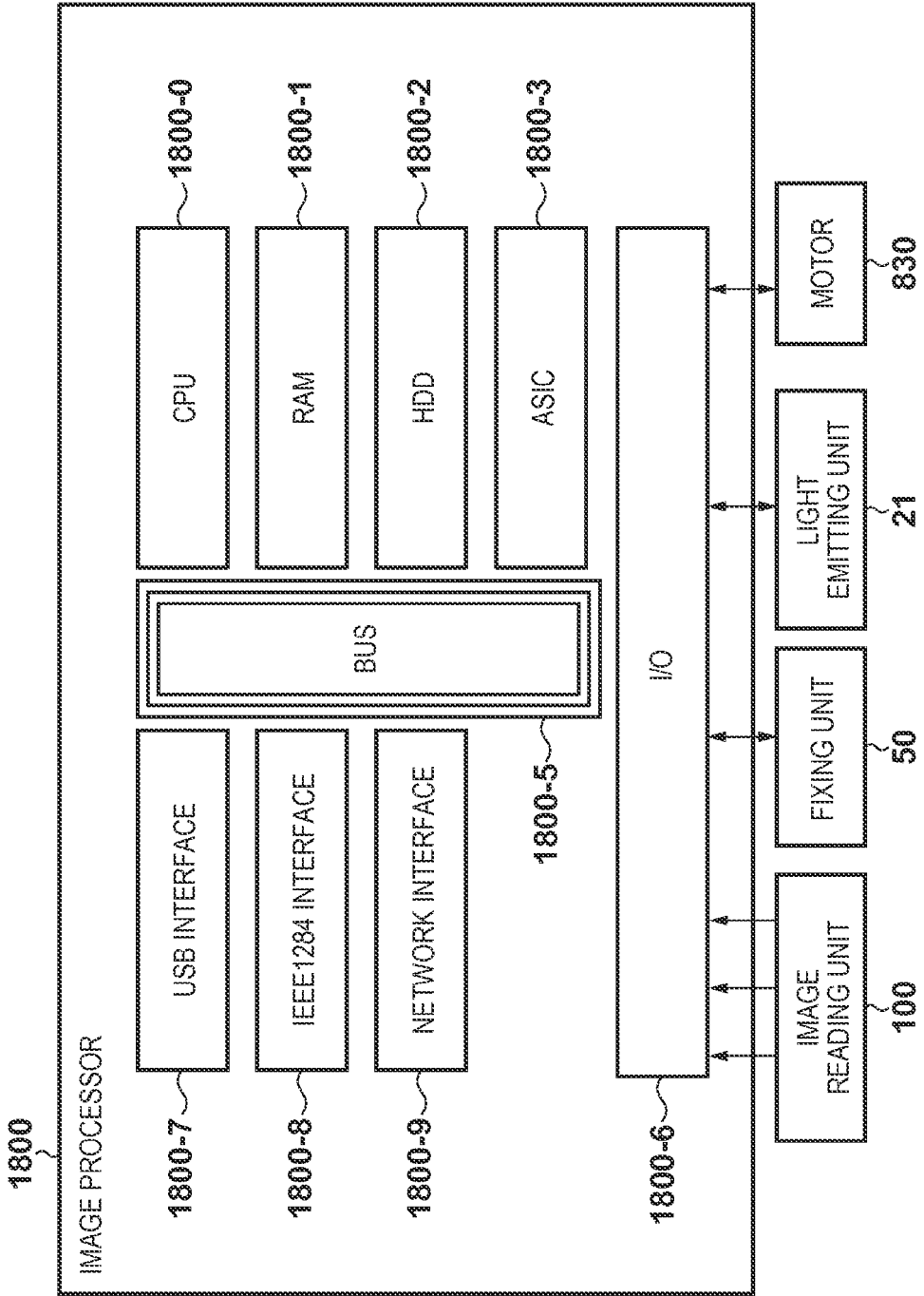
FIG. 18 is a block diagram showing the arrangement of the image processor of the image forming apparatus according to the second embodiment.

FIG. 18 is a block diagram showing the arrangement of an image processor 1800 of the image forming apparatus 1 according to the second embodiment.

In the second embodiment, the image forming apparatus 1 receives the PDL data 1700 generated by the host computer 4, and executes the above-described print process. The print process is implemented by image processing by the image processor 1800 of the electronic unit 800, and control of respective units in the image forming apparatus 1. The image processor 1800 will be explained with reference to FIG. 18.

A USB interface 1800-7 inputs the PDL data 1700 to the image forming apparatus 1 from the outside via a USB external apparatus. Similarly, an IEEE1284 interface 1800-8 inputs the PDL data 1700 to the image forming apparatus 1 from the outside via an external apparatus having IEEE1284 hardware. Similarly, a network interface 1800-9 inputs the PDL data 1700 to the image forming apparatus 1 from an external apparatus (e.g., the host computer 4) having network hardware. The USB interface 1800-7, IEEE1284 interface 1800-8, and network interface 1800-9 receive the PDL data 1700 under the control of a communication controller 1900-0 in FIG. 19 (to be described later).

A CPU 1800-0 executes processes including PDL analysis processing (to be described later) by executing instructions saved in a RAM 1800-1. The RAM 1800-1 is a volatile storage medium. The RAM 1800-1 can save the PDL data 1700, instructions to be executed by the CPU 1800-0, and the like. The RAM 1800-1 holds the PDL data 1700, instructions to be executed by the CPU 1800-0, and the like via a bus 1800-5. An HDD 1800-2 is a nonvolatile storage medium, and saves instructions and data to be processed by the CPU 1800-0. The HDD 1800-2 can save instructions and data to be processed by the CPU 1800-0 that will be lost from the RAM 1800-1 by power-off. The HDD 1800-2 is larger in storage capacity than the RAM 1800-1. The HDD 1800-2 is therefore suited to saving a large amount of data typified by image formation bitmap data (to be described later). The second embodiment exemplifies the HDD as a nonvolatile storage medium, but a flash EEPROM, ferroelectric memory (Fe-RAM), magnetoresistive memory (MRAM), or the like may be used instead of the HDD.

An ASIC 1800-3 can control image processing (to be described later) and the respective units of the image forming apparatus 1. The bus 1800-5 connects the respective units of the image processor 1800, and allows exchanging data and instructions between them. An I/O 1800-6 implements communication of data and control signals between the image processor 1800 and the image reading unit 100 and the like.

Figure 19:
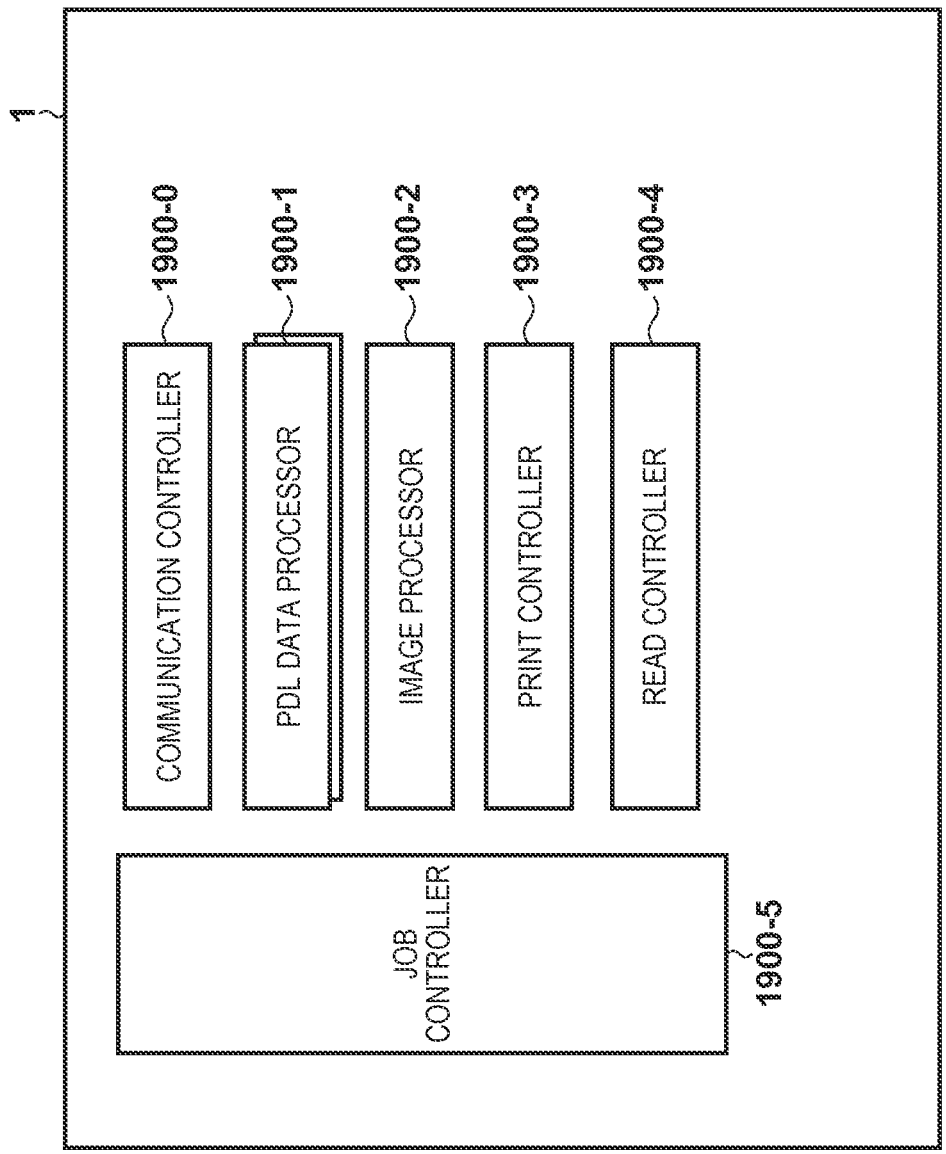
FIG. 19 is a block diagram for explaining the software modules of the image forming apparatus according to the second embodiment.

FIG. 19 is a block diagram for explaining the software modules of the image forming apparatus 1 according to the second embodiment.

Figure 20:
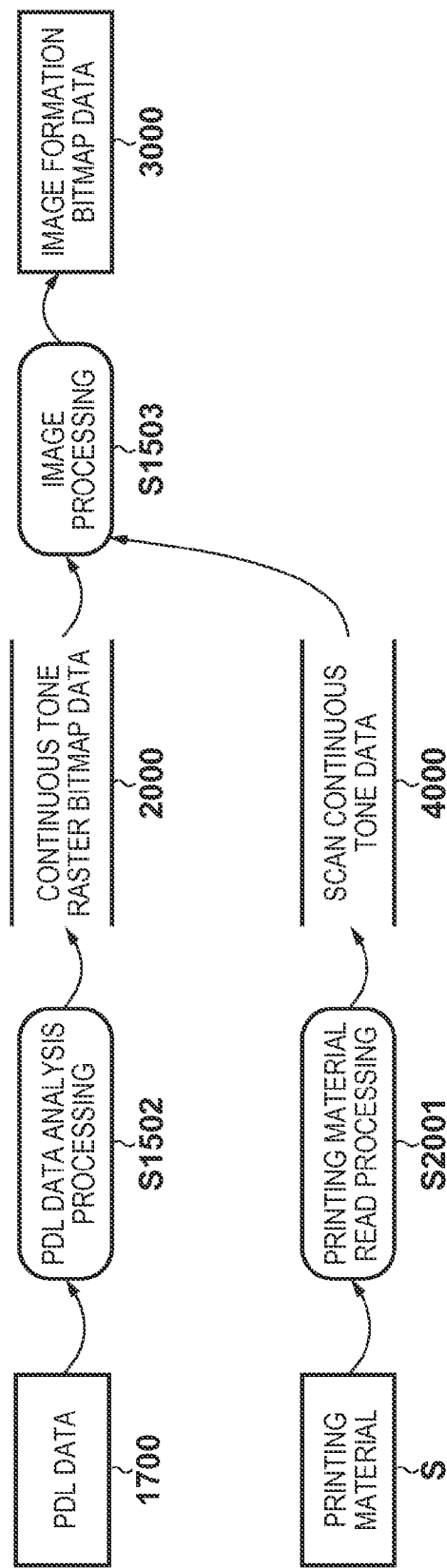
FIG. 20 depicts a view for explaining a processing sequence to execute print processing based on received PDL data on a sheet (original) S in the second embodiment.

First, a communication controller 1900-0 controls the above-described USB interface 1800-7, IEEE1284 interface 1800-8, and network interface 1800-9, and establishes communication with the host computer 4. Second, the communication controller 1900-0 controls the above-described USB interface 1800-7, IEEE1284 interface 1800-8, and network interface 1800-9, and receives the PDL data 1700. Third, the communication controller 1900-0 can store the received PDL data 1700 in the RAM 1800-1. A PDL data processor 1900-1 performs analysis processing of the PDL data 1700 stored in the RAM 1800-1 (to be described later), generating continuous tone raster bitmap data 2000 (FIG. 20). An image processor 1900-2 generates image formation bitmap data 3000 (FIG. 20) by using the continuous tone bitmap data generated by the PDL data processor 1900-1 and the ASIC 1800-3.

A print controller 1900-3 performs print processing according to the image formation bitmap data. A read controller 1900-4 performs the above-described original read processing. A job controller 1900-5 performs information transmission and processing flow transmission between the software modules 1900-0 to 1900-4. The job controller 1900-5 implements image formation processing typified by printing in the image forming apparatus 1.

The second embodiment assumes that software runs not only on the CPU 1800-0 but also on the ASIC 1800-3 in order to reduce the load on the CPU 1800-0 by executing some processes on the ASIC 1800-3. As a matter of course, all software processes may be performed by the CPU 1800-0 or ASIC 1800-3.

Note that print processing under the control of the print controller 1900-3 according to the second embodiment is the same as that described in the first embodiment, and a description thereof will not be repeated.

FIG. 20 depicts a view for explaining a processing sequence to execute print processing based on received PDL data on a sheet (original) S in the second embodiment. Note that the same reference numerals as those in the above-described drawings denote the same parts.

The image reading unit 100 is connected to the CPU 1800-0, ASIC 1800-3, RAM 1800-1, and the like via the I/O 1800-6. The second embodiment will explain image read processing (step S2001 in FIG. 20) of the sheet S by using the image reading unit 100.

The read controller 1900-4 running on the CPU 1800-0 conveys the sheet S by driving a double-sided flapper solenoid 820, a double-sided driving motor 840, and the like. The read controller 1900-4 controls the image reading unit 100, and receives luminance signals of continuous tones of three, red, green, and blue from the image reading unit 100. The read controller 1900-4 generates scan continuous tone data 4000 based on the luminance signals, and saves it in the RAM 1800-1. The read controller 1900-4 operates a switchback solenoid 821 to switch a switchback flapper 82 to the original dedicated feed path 81. The read controller 1900-4 controls the motor 840 to convey the sheet S to a second discharge unit 110. In this manner, the read controller 1900-4 generates the scan continuous tone data 4000 formed from three, red, green, and blue (to be referred to as R, G, and B hereinafter), and stores it in the RAM 1800-1.

In the second embodiment, the image forming apparatus 1 receives the PDL data 1700 as input data via the USB interface 1800-7, IEEE1284 interface 1800-8, or network interface 1800-9. The job controller 1900-5 saves the received PDL data 1700 in the RAM 1800-1 or HDD 1800-2. The PDL data processor 1900-1 analyzes the PDL data 1700 under the control of the job controller 1900-5, generating the continuous tone raster bitmap data 2000 (step S1502). The continuous tone raster bitmap data 2000 is saved in the RAM 1800-1. In the second embodiment, the CPU 1800-0 executes PDL data analysis processing (step S1502). However, the ASIC 1800-3 may execute part or all of the processing.

Then, the image processor 1900-2 inputs the continuous tone raster bitmap data 2000 and scan continuous tone data 4000 by the ASIC 1800-3, and generates the image formation bitmap data 3000 (step S1503). The ASIC 1800-3 saves the image formation bitmap data 3000 in the RAM 1800-1.

The print controller 1900-3 executes printing in accordance with the image formation bitmap data 3000 under the control of the job controller 1900-5. The image processing in step S1503 is executed by the ASIC 1800-3 in the second embodiment, but may be executed by the CPU 1800-0.

The image processing (step S1503) by the ASIC 1800-3 using the continuous tone raster bitmap data 2000 and scan continuous tone data 4000 will be explained with reference to FIGS. 21 to 23.

First, the image processor 1900-2 running on the ASIC 1800-3 reads out the scan continuous tone data 4000 from the RAM 1800-1. Then, the image processor 1900-2 calculates, from the scan continuous tone data 4000, the amount of applied toner of an image already formed on the sheet S. An applied amount calculation method in the second embodiment will be described.

Figure 21:
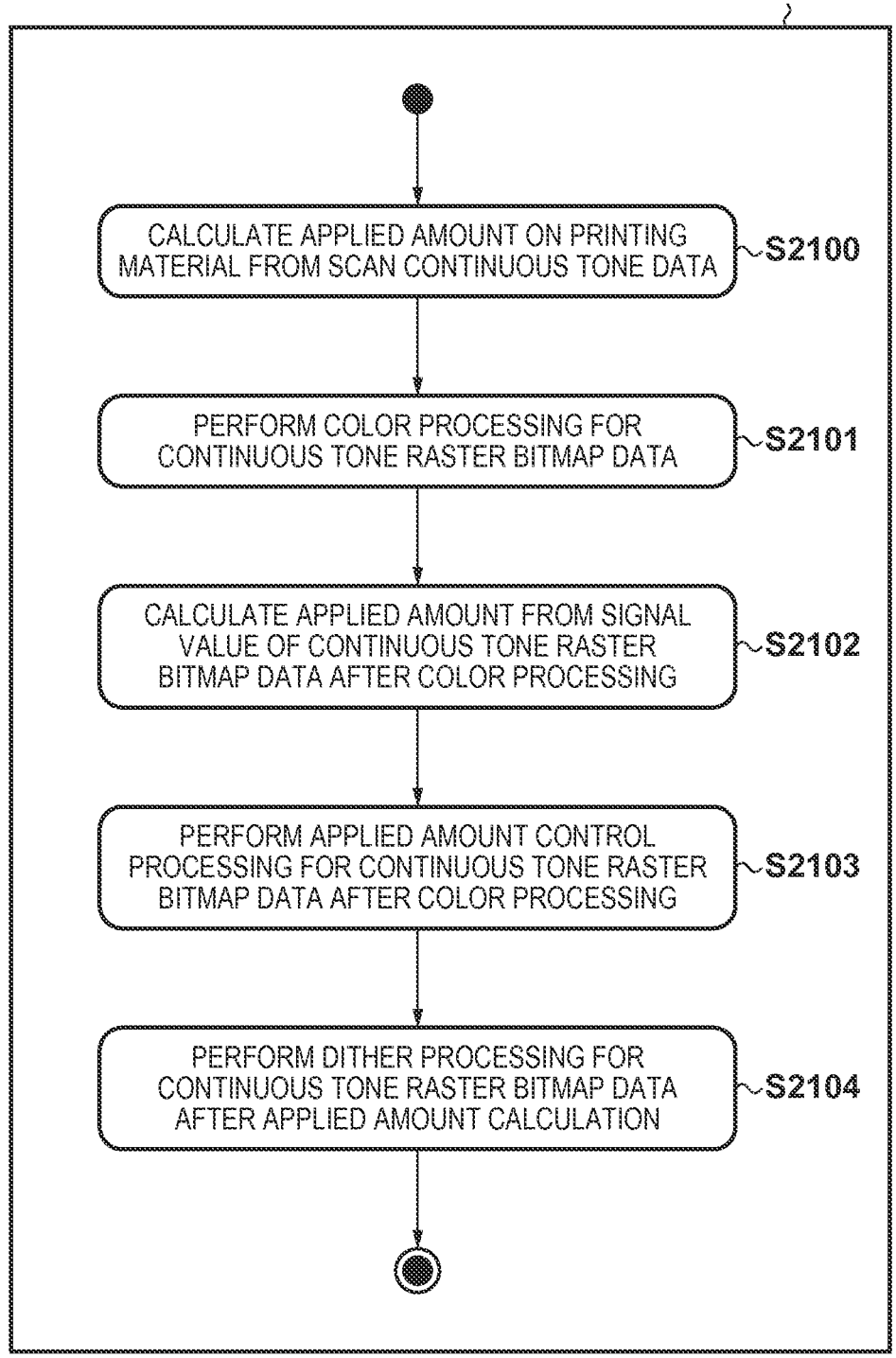
FIG. 21 is a flowchart for describing processing by the image processor of the image forming apparatus according to the second embodiment.

FIG. 21 is a flowchart for describing processing by the image processor 1900-2 of the image forming apparatus 1 according to the second embodiment. Note that a program which executes this processing is loaded from the HDD 1800-2 to the RAM 1800-1 at the time of execution, and executed under the control of the CPU 1800-0.

Figure 22:
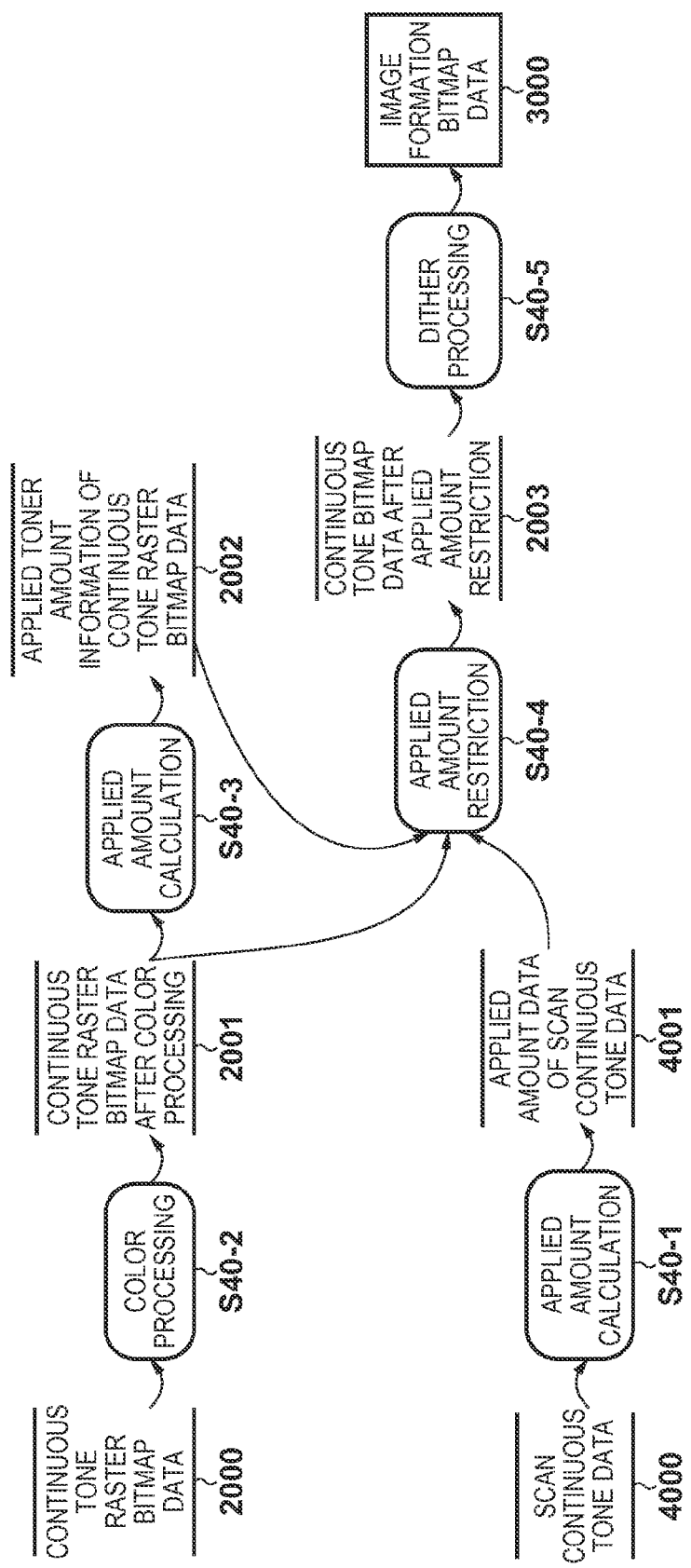
FIG. 22 depicts a view for explaining an image processing sequence in the image forming apparatus according to the second and third embodiments.

FIG. 22 depicts a view for explaining an image processing sequence in the image forming apparatus 1 according to the second embodiment.

First, in step S2100, the image processor 1900-2 obtains C, M, Y, and K density signals from R, G, and B luminance signals of the scan continuous tone data 4000. The image processor 1900-2 converts the C, M, Y, and K density signals into applied toner amount values. Calculation of an applied toner amount in this processing needs to consider the spectral characteristics of the image reading unit 100 and those of toners applied on the sheet S. For example, when the toner applied on the sheet S is a low-density toner, a relatively large amount of toner has been applied on the sheet S even for the same density signal. To the contrary, when a high-density toner is applied, a relatively small amount of toner has been applied on the sheet S, compared to the former sheet S. That is, to accurately calculate an amount of toner applied on the sheet S, the spectral characteristics of toners used to print the sheet S need to be taken into consideration.

The amount of toner applied on the sheet S also depends on the spectral characteristics of the image reading unit 100. It is well known that, even if the image reading unit 100 reads the same target (for example, an image on a sheet S), an obtained luminance signal value changes depending on the optical characteristic of the reading element of the image reading unit 100. To obtain an amount of toner applied on the sheet S, the spectral characteristics of the image reading unit 100 need to be considered. In the second embodiment, the spectral characteristics of toners and those of the image reading unit 100 are saved in advance as SpectR, SpectG, SpectB, and SpectK in a lookup table in the HDD 1800-2.

For conversion processing from R, G, and B luminance signals, the image processor 1900-2 converts R, G, and B luminance signals into C, M, Y, and K density signals. For conversion into C, M, Y, and K density signals, the image processor 1900-2 considers even image processing in the image forming apparatus. This is because the amount of applied toner changes depending on the image processing method in the image forming apparatus 1 even for almost the same color formed on the sheets S. For example, even for the sheets S printed in gray, there are an image processing method of expressing gray by adding C, M, and Y in addition to K, and an image processing method of expressing gray by only K. The amount of applied toner becomes smaller in the latter case than in the former case. To obtain, from R, G, and B luminance signals obtained by the image reading unit 100, C, M, Y, and K density signals each representing an amount of applied toner, the image processing method in the image forming apparatus which formed an image on the sheet S needs to be taken into consideration.

From this, in the second embodiment, a conversion lookup table considering image processing in the image forming apparatus is saved in advance in the HDD 1800-2. More specifically, the second embodiment assumes image processing which applies a largest amount of toner, out of image processing methods prepared in the image forming apparatus. As a correction lookup table for obtaining an amount of applied toner from R, G, and B luminance signals, PredictUCR and PredictBG are saved in the HDD 1800-2.

The image processor 1900-2 performs the following calculation including conversion based on the above-mentioned lookup tables SpectR, SpectG, SpectB, SpectK, PredictUCR, and PredictBG. In this fashion, C, M, Y, and K density signals representing amounts of applied toners based on the R, G, and B luminance signals of the scan continuous tone data 4000 are obtained.

First, the image processor 1900-2 obtains C, M, Y, and K density signals C', M', Y', and K' by calculation represented by equations (1):

$$C'=1.0-\text{Spect}R(R)$$

$$M'=1.0-\text{Spect}G(G)$$

$$Y'=1.0-\text{Spect}B(B)$$

$$K'=\text{Spect}K(\min(C',M',Y')) \quad (1)$$

Then, C, M, Y, and K density signals each representing an amount of applied toner are obtained by performing calculation according to equations (2) for the C', M', Y', and K' values obtained by equations (1):

$$C=\min(1.0,\max(0.0,C'-\text{PredctUCR}(K')))$$

$$M=\min(1.0,\max(0.0,M'-\text{PredctUCR}(K')))$$

$$Y=\min(1.0\max(0.0,Y'-\text{PredctUCR}(K')))$$

$$K=\min(1.0,\max(0.0,\text{PredctBG}(K')))$$

UCR is undercolor removal processing considering an image processing method in the image forming apparatus. In the second embodiment, the undercolor removal processing is performed based on the K' value by using a lookup table considering undercolor removal processing in the image forming apparatus. BG is black generation processing considering an image processing method in the image forming apparatus 1. In the second embodiment, the black generation processing is also performed based on the K' value by using a lookup table considering black generation processing in the image forming apparatus 1. Note that max(a, b) indicates a function which takes a maximum value among given values (a, b), and min(a, b) indicates a function which takes a minimum value among given values (a, b).

Further, the image processor 1900-2 calculates an amount of toner applied on the sheet S by performing the following calculation for the obtained C, M, Y, and K density signals of continuous tones. That is, the image processor 1900-2 performs the following calculation using the C, M, Y, and K values obtained by the above calculation as input values:

$$\text{SumToner}=C+M+Y+K \quad (3)$$

The image processor 1900-2 executes the above-described calculation sequentially for all the pixels of the scan continuous tone data 4000. The image processor 1900-2 saves, in the RAM 1800-1, the SumToner values obtained by these calculations as applied amounts on the sheet S that are obtained from the scan continuous tone data 4000. At this time, the applied amounts are saved as applied toner amount data 4001 (FIG. 22) of the scan continuous tone data in a two-dimensional array of continuous tones. In this way, the amount (first amount) of applied toner of the image already formed on the sheet S is calculated and stored in the RAM 1800-1 in step S2100.

Then, in step S2101, the image processor 1900-2 performs color processing for the continuous tone raster bitmap data 2000. In this color processing, the image processor 1900-2 performs the following processing. First, the image processor 1900-2 performs dot gain simulation processing and color processing of simulating an ink smear in a printer. These processes are performed based on lookup tables set in advance in the image forming apparatus 1.

More specifically, in the second embodiment, these lookup tables are saved in advance with a name "DotGain" in the HDD 1800-2. The image processor 1900-2 performs color processing (step S40-2) for the continuous tone raster bitmap data 2000 by performing the following calculation including conversion based on the lookup table DotGain. Note that Kin is a K value of the continuous tone raster bitmap data 2000, and Kout is a K value after conversion:

$$Kout = DotGain(Kin)$$

Note that the second embodiment has already explained printing in single black. For multicolor printing, the present invention can be implemented by performing multicolor processing. Note that four-color processing will be described in the third embodiment.

The image processor 1900-2 saves, as the continuous tone raster bitmap data 2000 after color processing in the RAM 1800-1, the C, M, Y, and K density signals Cout, Mout, Yout, and Kout in a two-dimensional array of continuous tones obtained by the above calculations.

In step S2102, the image processor 1900-2 calculates an amount of applied toner from the continuous tone raster bitmap data 2000 after color processing. Letting Cout, Mout, Yout, and Kout be the C, M, Y, and K color density signal values of the continuous tone raster bitmap data 2000 after color processing, the applied toner amount SumToner_out of each pixel can be obtained by the following equation:

$$SumToner\_out = Kout$$

The image processor 1900-2 executes this calculation for each pixel of the continuous tone raster bitmap data 2000, and saves the result in the RAM 1800-1. By this processing, the image processor 1900-2 can obtain two-dimensional information representing the applied toner amounts of all the pixels of the continuous tone raster bitmap data 2000. Further, the image processor 1900-2 saves, as applied toner amount information 2002 of the continuous tone raster bitmap data 2000 in the RAM 1800-1, two-dimensional information representing the applied toner amounts of all the pixels of the continuous tone raster bitmap data 2000. Accordingly, in step S2102, an amount of toner to be applied to the sheet S when printing is performed based on PDL data of a print job received from an external apparatus (host computer) is calculated and stored in the RAM 1800-1.

The process advances to step S2103, and the image processor 1900-2 performs applied toner amount restriction processing for continuous tone bitmap data 2001 after color processing in step S40-2. In the second embodiment, the applied toner amount restriction processing in step S2103 includes the following processes.

First, the image processor 1900-2 reads out the maximum value of an applied toner amount saved in advance in the HDD 1800-2, and saves it with a variable name "SumToner_max" in the RAM 1800-1. Second, the image processor 1900-2 adds the applied amount data 4001 of the scan continuous tone data 4000 and the applied toner amount information 2002 of the continuous tone raster bitmap data 2000, and calculates an amount of toner to be applied on the sheet S. More specifically, the image processor 1900-2 performs the following processes to calculate an amount (second amount) of toner predicted to be applied on the sheet S when print processing is executed based on PDL data received from the host computer.

Here, both the applied amount data 4001 of the scan continuous tone data 4000 and the applied toner amount information 2002 of the continuous tone bitmap data 2001 are two-dimensional arrays. The image processor 1900-2 executes the following calculation while scanning these two two-dimensional arrays along the x- and y-axes shown in FIG. 23.

First, the image processor 1900-2 calculates a maximum applied toner amount considering the applied amount data 4001 of the scan continuous tone data 4000. Then, the image processor 1900-2 obtains the toner restriction ratio of the applied toner amount information 2002 of the continuous tone bitmap data 2001 based on the maximum applied toner amount. Finally, the image processor 1900-2 performs processing of restricting the applied amount for the continuous tone bitmap data 2001 after color processing based on the toner restriction ratio.

To explain this processing in more detail, the second embodiment will explain addition processing using virtual codes. First, the array of the applied amount data 4001 of the scan continuous tone data 4000 is defined as src_toner[ ][ ], and the array of the applied toner amount information 2002 of the continuous tone bitmap data 2001 is defined as print_toner[ ][ ]. Further, the size of these two arrays along the x-axis is defined as width, and the size along the y-axis is defined as height. The image processor 1900-2 performs processing as represented by the following [Virtual Code 1]. In the following virtual codes, a number and colon (:) at the left end indicate a line number.

[Virtual Code 1]

```
1:   int x, y, sum_toner;
2:
3:   for (x = 0; x < width; x++){
4:    for (y = 0; y < height; y++){
5:     SumToner_max = SumToner_max - src_toner[x][y];
6:
7:     if(SumToner_max < 0){
8:      SumToner_max = 0;
9:     }
10:   }
11:}
```

By this processing, the image processor 1900-2 can calculate a maximum applied toner amount considering the applied amount data 4001 of the scan continuous tone data 4000.

Third, the image processor 1900-2 obtains a restriction ratio tor_ratio for calculating an amount of applied toner of the continuous tone bitmap data 2001 after restricting a toner amount based on the maximum applied toner amount. More specifically, the image processor 1900-2 performs processing as represented by the following [Virtual Code 2]. A description of this calculation in addition to the above virtual code is as follows:

[Virtual Code 2]

```
1:   int x, y, sum_toner;
2:   float tor_ratio;
3:
4:   for (x = 0; x < width; x++){
5:    for (y = 0; y < height; y++){
6:     SumToner_max = SumToner_max - src_toner[x][y];
7:
8:     if(SumToner_max <= 0){
9:      //
10:    }else{
11:     tor_ratio = print_toner[x][y]/SumToner_max;
12:    }
13:
14:   }
15:}
```

By this processing, the image processor 1900-2 can obtain a restriction parameter for restricting the applied toner amount of each pixel to be formed on the sheet S.

Fourth, the image processor 1900-2 performs restriction processing for a density signal represented by the continuous tone bitmap data 2001 after color processing by using the restriction parameter tor_ratio for restricting an amount of applied toner. Then, the image processor 1900-2 saves, as continuous tone bitmap data 2003 after applied amount restriction in the RAM 1800-1, the result of performing restriction processing for the density signal represented by the continuous tone bitmap data 2001 after color processing.

More specifically, the image processor 1900-2 performs the following processing. The image processor 1900-2 multiplies each color value of each pixel of the continuous tone bitmap data 2001 after color processing by the restriction parameter tor_ratio for restricting an amount of applied toner. When forming an image in only black on the sheet S, the image processor 1900-2 performs calculation as represented by the following [Virtual Code 3] by using the parameter tor_ratio. Letting out bitmap[ ][ ] be the two-dimensional array of the bitmap data 2003 after applied amount restriction, a description of this calculation in addition to the above virtual codes is as follows:

[Virtual Code 3]

```
1:    int x, y, sum_toner;
2:    float tor_ratio;
3:
4:    for (x = 0; x < width; x++){
5:      for (y = 0; y < height; y++){
6:        SumToner_max = SumToner_max − src_toner[x][y];
7:
8:        if(SumToner_max <= 0){
9:          out_bitmap [x][y] = 0;
10:       }else{
11:         tor_ratio = print_toner[x][y]/SumToner_max;
12:         out_bitmap[x][y] = out_bitmap[x][y]*tor_ratio;
13:       }
14:
15:   }
16: }
```

By the above series of processes, the image processor 1900-2 can generate the bitmap data 2003 after applied amount restriction as continuous tone bitmap data which restricts the applied toner amount of each pixel to be formed on the sheet S. Accordingly, in step S2103, the maximum applied toner amount is calculated by adding the applied amount data of the scan continuous tone data 4000 arranged two-dimensionally in the RAM 1800-1 and the applied toner amount information of the continuous tone bitmap data 2001. Based on the maximum applied toner amount, the restriction ratio for calculating an amount of applied toner of the continuous tone bitmap data after restricting a toner amount is obtained. The bitmap data 2003 after converting the continuous tone bitmap data and restricting the amount of applied toner is obtained.

In step S2104, the image processor 1900-2 performs dither processing for the bitmap data 2003 after restricting the amount of applied toner, obtaining the image formation bitmap data 3000. This processing is executed by reading out a dither pattern saved in advance from the HDD 1800-2 by the image processor 1900-2, and providing the dither pattern to each pixel of the bitmap data 2003 after applied amount restriction. The obtained image formation bitmap data 3000 is saved in the RAM 1800-1.

As described above, the print controller 1900-3 prints in accordance with the image formation bitmap data 3000 saved in the RAM 1800-1 under the control of the job controller 1900-5.

The above-described second embodiment is summarized as follows. That is, when the image forming apparatus 1 receives the PDL data 1700, it performs a series of paper conveyance processes for a sheet S. In the paper conveyance, the image forming apparatus reads the sheet S. Then, the image forming apparatus 1 analyzes the PDL data 1700 received from the host computer. Based on the read processing of the sheet S, the image forming apparatus 1 generates the applied toner amount data 4001 of the sheet S (step S2100). The image forming apparatus obtains, from the PDL data 1700, the applied toner amount information 2002 at the time of printing the PDL data 1700 (step S2102). The image forming apparatus 1 restricts the amount of applied toner by using the applied toner amount information 2002 and applied toner amount data 4001 (step S2103), obtaining the bitmap data 2003 after applied toner amount restriction. The image forming apparatus then prints in accordance with the bitmap data 2003 after applied toner amount restriction.

According to the second embodiment, the image forming apparatus 1 generates applied toner amount information at the time of printing based on PDL data by taking account of even the amount of toner already applied on the sheet S. Even when the sheet S has already been printed and the toner has been applied, the toner can be transferred to print on the sheet within the restriction of the ability of the image forming apparatus 1. The image forming apparatus according to the second embodiment can suppress degradation of the image quality of a printed image on a sheet arising from scattering of toner caused by a transfer error or fixing error, or the like.

Third Embodiment

In the second embodiment, the image forming apparatus 1 prints in only black. However, the present invention can be implemented even when image formation is performed using four, C, M, Y, and K or a larger number of colors, as described in the second embodiment. That is, the present invention is applicable to a case in which a color image is printed by transferring and fixing four, C, M, Y, and K toners onto the sheet S, as is well known. For this purpose, image processing in step S1503 of FIG. 15 needs to be image processing for four, C, M, Y, and K or only black. The third embodiment will therefore explain image processing in step S1503 for forming an image using four, C, M, Y, and K. For this purpose, image processing by an ASIC 1800-3 using continuous tone raster bitmap data 2000 and scan continuous tone data 4000 will be explained with reference to FIGS. 21 to 23. Note that the arrangement of an image forming apparatus 1 and the like according to the third embodiment are the same as those in the above-described embodiments, and a description thereof will not be repeated.

FIG. 22 depicts a view for explaining an image processing sequence in the image forming apparatus 1 according to the third embodiment.

First, an image processor 1900-2 reads out the scan continuous tone data 4000 saved in a RAM 1800-1. Then, the image processor 1900-2 calculates, from the scan continuous tone data 4000, an amount of toner applied on a sheet S. An applied amount calculation method in the third embodiment will be described below.

The image processor 1900-2 obtains C, M, Y, and K density signals from R, G, and B luminance signals of the scan continuous tone data 4000, and converts the C, M, Y, and K density signals into applied toner amount values (step S40-1). Of these processes, to calculate an amount of applied toner, the spectral characteristics of an image reading unit 100, the spectral characteristics of toners on the sheet S, image processing to be performed by the image forming apparatus 1, and the like are considered, similar to the second embodiment. These processes have already been explained in the second embodiment, and a description thereof will not be repeated.

Based on equations (1) to (3) according to the second embodiment, C, M, Y, and K density signals each representing an amount of applied toner are obtained from C, M, Y, and K density signals C', M', Y', and K'. Further, the image processor 1900-2 calculates an amount of toner applied on the sheet S, and executes the above-described calculation sequentially for all the pixels of the scan continuous tone data 4000. The image processor 1900-2 saves, in the RAM 1800-1, the SumToner values obtained by these calculations as applied amounts on the sheet S that are obtained from the scan continuous tone data 4000. At this time, the applied amounts are saved as applied amount data (4001 in FIG. 23) of the scan continuous tone data in a two-dimensional array of continuous tones.

Then, in step S40-2, the image processor 1900-2 performs color processing for the continuous tone raster bitmap data 2000. In this color processing, the image processor 1900-2 performs the following processing. First, the image processor 1900-2 performs UCR (Under Color Removal) processing. Second, the image processor 1900-2 performs BG (Black Generation) processing. These known processes are performed in accordance with lookup tables stored in advance in the image forming apparatus 1. More specifically, in the third embodiment, these lookup tables are saved in advance with names "UCR" and "BG" in an HDD 1800-2. The image processor 1900-2 performs color processing (step S40-2) for the continuous tone raster bitmap data 2000 by performing the following calculation including conversion based on these lookup tables UCR and BG. Note that Cin, Min, Yin, and Kin are C, M, Y, and K values of the continuous tone raster bitmap data 2000, and Cout, Mout, Yout, and Kout are respective values after conversion:

$$Cout=\min(1.0, \max(0.0, Cin-UCR(Kin)))$$

$$Mout=\min(1.0, \max(0.0, Min-UCR(Kin)))$$

$$Yout=\min(1.0, \max(0.0, Yin-UCR(Kin)))$$

$$Kout=\min(1.0, \max(0.0, BG(Kin))) \quad (4)$$

The image processor 1900-2 saves, as continuous tone bitmap data 2001 after color processing in the RAM 1800-1, the C, M, Y, and K density signals Cout, Mout, Yout, and Kout in a two-dimensional array of continuous tones obtained by the calculation of equations (4). The min (a, b) and max (a, b) indicate the same function as those in the second embodiment.

In step S40-3, the image processor 1900-2 calculates an amount of applied toner from the continuous tone bitmap data 2001 after color processing. Letting Cout, Mout, Yout, and Kout be the C, M, Y, and K color density signal values of the continuous tone bitmap data 2001 after color processing, the applied toner amount SumToner_out of each pixel can be obtained by the following equation:

$$SumToner\_out=Cout+Mout+Yout+Kout$$

The image processor 1900-2 executes this calculation for each pixel of the continuous tone raster bitmap data 2000, and saves the result in the RAM 1800-1. By this processing, the image processor 1900-2 can obtain two-dimensional information representing the applied toner amounts of all the pixels of the continuous tone bitmap data 2001. Further, the image processor 1900-2 saves, as applied toner amount information (2002 in FIGS. 22 and 23) of the continuous tone bitmap data in the RAM 1800-1, two-dimensional information representing the applied toner amounts of all the pixels of the continuous tone bitmap data 2001. In step S40-4, the image processor 1900-2 performs applied toner amount restriction processing for the continuous tone bitmap data after color processing.

In the third embodiment, the applied toner amount restriction processing includes the following processes.

First, the image processor 1900-2 reads out the maximum value of an applied toner amount saved in advance in the HDD 1800-2, and saves it with a variable name "SumToner_max" in the RAM 1800-1. Second, the image processor 1900-2 adds the applied amount data 4001 of the scan continuous tone data and the applied toner amount information 2002 of the continuous tone bitmap data, and calculates an amount of toner to be applied on the sheet S. More specifically, the image processor 1900-2 performs the following processes to calculate an amount of toner predicted to be applied on the sheet S. Here, both the applied amount data 4001 of the scan continuous tone data and the applied toner amount information 2002 of the continuous tone bitmap data are two-dimensional arrays. The image processor 1900-2 executes the following calculation while scanning these two two-dimensional arrays along the x- and y-axes shown in FIG. 23.

First, the image processor 1900-2 calculates a maximum applied toner amount considering the applied amount data 4001 of the scan continuous tone data 4000. Then, the image processor 1900-2 obtains the toner restriction ratio of the applied toner amount information 2002 of the continuous tone bitmap data 2001 based on the maximum applied toner amount. Finally, the image processor 1900-2 performs applied amount processing for the continuous tone bitmap data 2001 after color processing based on the toner restriction ratio.

To explain this processing in more detail, the third embodiment will explain addition processing using virtual codes. First, the array of the applied amount data 4001 of the scan continuous tone data is defined as src_toner[ ][ ], and the array of the applied toner amount information 2002 of the continuous tone bitmap data is defined as print_toner[ ][ ]. Further, the size of these two arrays along the x-axis is defined as width, and the size along the y-axis is defined as height. The image processor 1900-2 performs processing as represented by [Virtual Code 1] described in the second embodiment.

By this processing, the image processor 1900-2 can calculate a maximum applied toner amount considering the applied amount data 4001 of the scan continuous tone data.

Third, the image processor 1900-2 obtains a restriction ratio tor_ratio for calculating an amount of applied toner of the continuous tone bitmap data after toner restriction based on the maximum applied toner amount. More specifically, the image processor 1900-2 performs processing as represented by [Virtual Code 2] described in the second embodiment.

By this processing, the image processor 1900-2 can obtain a restriction parameter for restricting the applied toner amount of each pixel to be formed on the sheet S.

Fourth, the image processor 1900-2 performs restriction processing for a density signal represented by the continuous tone bitmap data 2001 after color processing by using the restriction parameter tor_ratio for restricting an amount of applied toner. Then, the image processor 1900-2 saves, as continuous tone bitmap data 2003 after applied amount restriction in the RAM 1800-1, the result of performing restriction processing for a density signal represented by the continuous tone bitmap data 2001 after color processing. More specifically, the image processor 1900-2 performs the following processing. The image processor 1900-2 multiplies each color value of each pixel of the continuous tone bitmap data 2001 after color processing by the restriction parameter tor_ratio for restricting an amount of applied toner. When forming an image in only black on a sheet S, the image processor 1900-2 multiplies K by tor_ratio. When forming an image in four, C, M, Y, and K on the sheet S, the image processor 1900-2 multiplies these four colors by tor_ratio. Letting out bitmap[ ][ ] be the two-dimensional array of the bitmap data 2003 after applied amount restriction, this calculation is represented by [Virtual Code 3] described in the second embodiment.

By the above series of processes, the image processor 1900-2 can generate the bitmap data 2003 after applied amount restriction as continuous tone bitmap data after restricting the applied toner amount of each pixel to be formed on the sheet S (end of step S40-4).

In step S40-5, the image processor 1900-2 performs dither processing for the bitmap data 2003 after applied amount restriction, obtaining image formation bitmap data 3000. This processing is executed by reading out a dither pattern saved in advance from the HDD 1800-2 by the image processor 1900-2, and providing the dither pattern to each pixel of the bitmap data 2003 after applied amount restriction. The obtained image formation bitmap data 3000 is saved in the RAM 1800-1.

As described above, the print controller 1900-3 prints in accordance with the image formation bitmap data 3000 saved in the RAM 1800-1 under the control of a job controller 1900-5.

According to the third embodiment, in addition to the effects of the second embodiment, even when the image forming apparatus 1 prints on paper on which color images of four, C, M, Y, and K have been printed, degradation of the image quality of a printed image arising from scattering of toner caused by a transfer error or fixing error, or the like can be suppressed.

Fourth Embodiment

Figure 23:
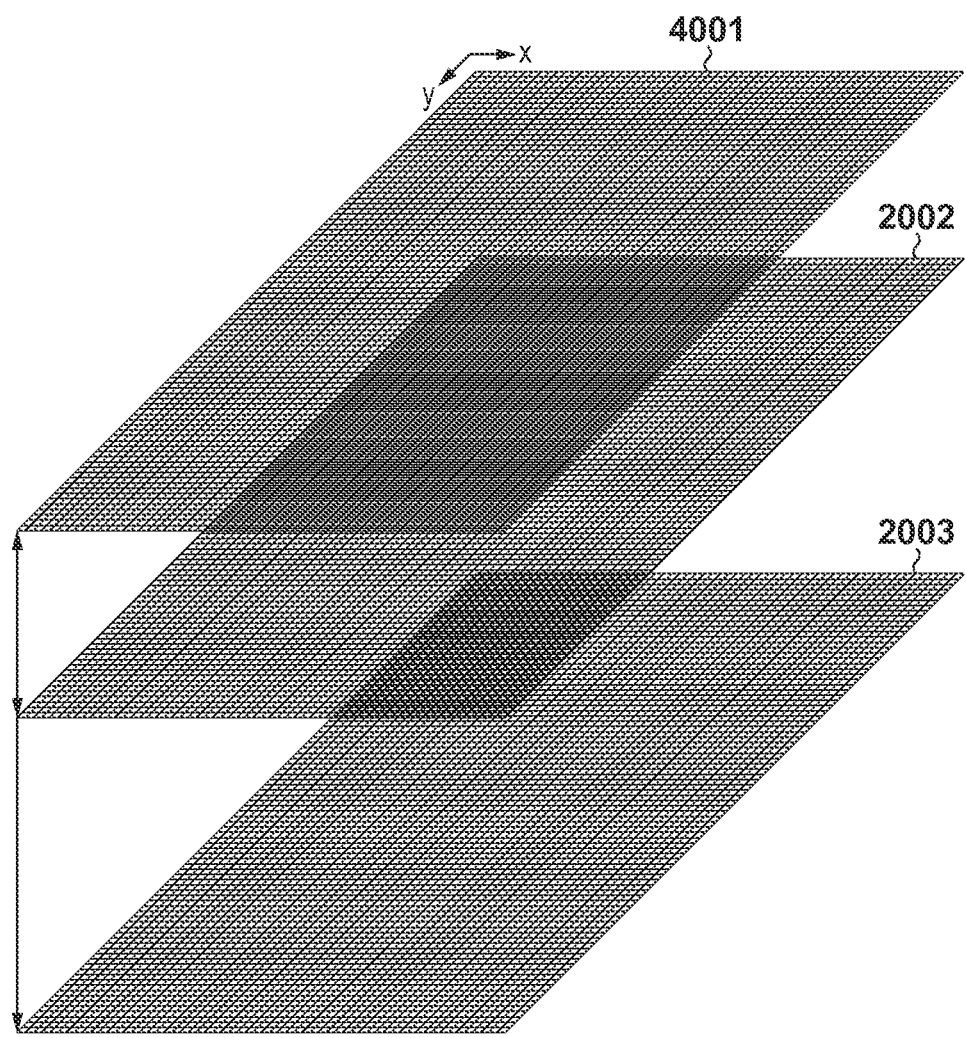
FIG. 23 depicts a view for explaining applied toner amount restriction processing according to the third embodiment.

In the second and third embodiments, the image processor 1900-2 prepares the array of the applied amount data 4001 of scan continuous tone data at the same resolution as that of the applied toner amount information 2002 of the continuous tone bitmap data, as shown in FIG. 23. By using the applied toner amount information 2002 and applied amount data 4001, the image processor 1900-2 obtains the bitmap data 2003 after applied amount restriction. Also, in the second and third embodiments, the applied amount data 4001 of the scan continuous tone data is obtained by calculating the scan continuous tone data 4000. In the second and third embodiments, the applied toner amount information 2002 of the continuous tone bitmap data is obtained by calculating the continuous tone raster bitmap data 2000. That is, in the second and third embodiments, the continuous tone raster bitmap data 2000 and scan continuous tone data 4000 have the same resolution. However, the present invention is applicable even when the continuous tone raster bitmap data 2000 and scan continuous tone data 4000 have different resolutions. The fourth embodiment will explain a case in which scan continuous tone data 4000 generated by an image reading unit 100 is lower in resolution than continuous tone raster bitmap data 2000. Note that the arrangement of an image forming apparatus 1 and the like according to the fourth embodiment are the same as those in the above-described embodiments, and a description thereof will not be repeated.

FIG. 25 depicts a view for explaining an image processing sequence in the image forming apparatus 1 according to the fourth embodiment. In FIG. 25, the same reference numerals as those in FIG. 20 denote the same parts, and a description thereof will not be repeated.

First, sheet read processing will be explained in short.

A read controller 1900-4 running on a CPU 1800-0 controls the image reading unit 100, and receives luminance signals of continuous tones of three, red, green, and blue from the image reading unit 100. The read controller 1900-4 sequentially saves the luminance signals in a read buffer 4100 of a RAM 1800-1. Then, the read controller 1900-4 reads out a value representing the reduction ratio of reduction processing for a read image saved in advance in an HDD 1800-2, and saves it with a variable name "scan_ratio" in the RAM 1800-1. The read controller 1900-4 performs reduction processing in step S21 of FIG. 25 based on the luminance signals saved in the read buffer 4100 and the reduction ratio scan_ratio. In the reduction processing, the read controller 1900-4 obtains a luminance signal in a reduction destination space by calculating the average value of the luminance signals saved in the read buffer 4100 serving as a reduction source space. By this reduction processing, the read controller 1900-4 generates the scan continuous tone data 4000 and saves it in the RAM 1800-1. After that, the read controller 1900-4 operates a switchback solenoid 821 to switch a switchback flapper 82 to the original dedicated feed path. The read controller 1900-4 controls a motor 840 to convey a sheet S to a second discharge unit 110. In this manner, the read controller 1900-4 running on the CPU 1800-0 stores the scan continuous tone data 4000 formed from three, red, green, and blue (to be referred to as R, G, and B hereinafter) in the RAM 1800-1.

Figure 24:
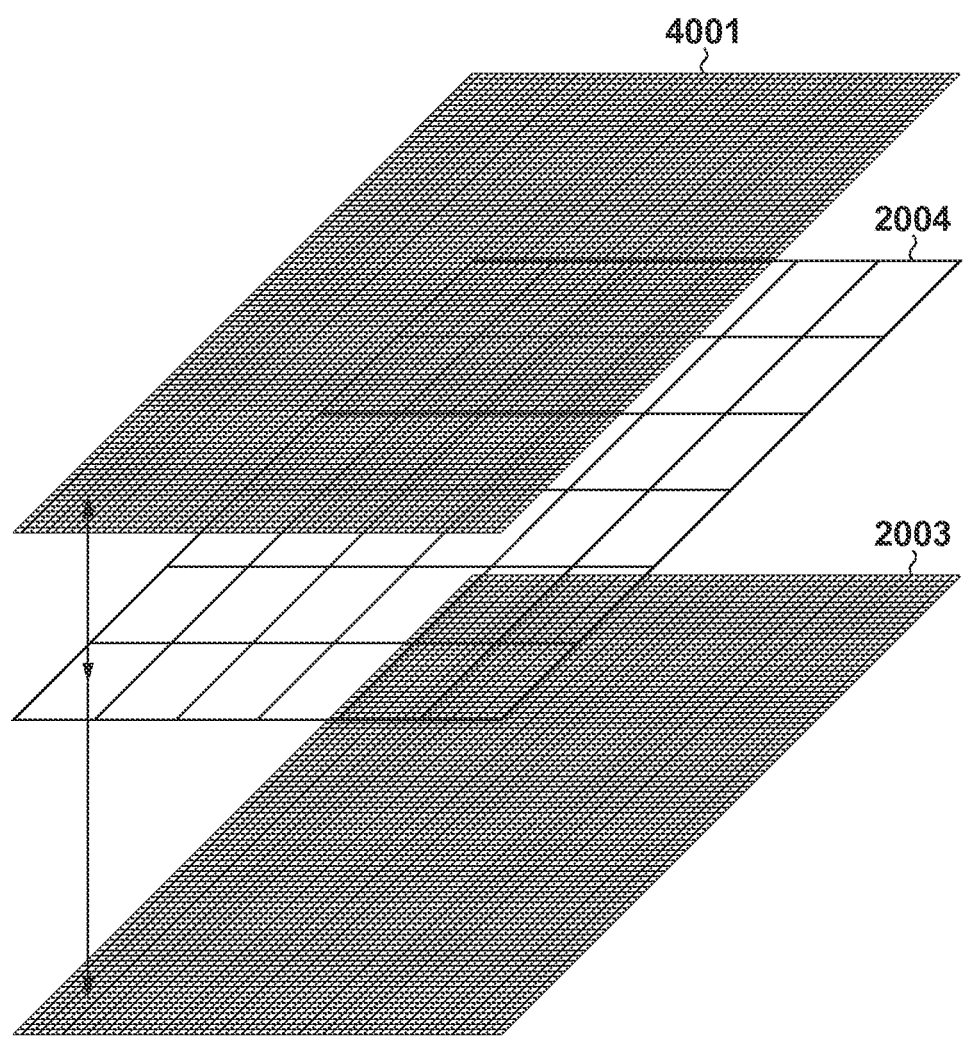
FIG. 24 depicts a view for explaining applied toner amount restriction processing according to the third embodiment.

By this read operation, the read controller 1900-4 can generate the low-resolution scan continuous tone data 4000 for generating applied toner amount information 2004 of continuous tone bitmap data shown in FIG. 24. FIG. 24 depicts a conceptual view for explaining a state in which continuous tone bitmap data 2003 after applied toner amount restriction is obtained from applied amount data 4001 of scan continuous tone data and the applied toner amount information 2004 of continuous tone raster bitmap data.

Image processing in step S1503 of FIG. 25 by an ASIC 1800-3 using the continuous tone raster bitmap data 2000 and scan continuous tone data 4000 will be explained with reference to FIGS. 21 to 23.

First, an image processor 1900-2 reads out the scan continuous tone data 4000 saved in the RAM 1800-1. Then, the image processor 1900-2 calculates, from the scan continuous tone data 4000, an amount of toner applied on the sheet S. An applied amount calculation method in the fourth embodiment will be described.

First, the image processor 1900-2 obtains C, M, Y, and K density signals from R, G, and B luminance signals of the scan continuous tone data 4000. Then, in step S40-1 of FIG. 22, the image processor 1900-2 converts the C, M, Y, and K density signals into applied toner amount values. At this time, the spectral characteristics of the image reading unit 100 and the spectral characteristics of toners on the sheet S are considered, similar to the above-described embodiments. In the fourth embodiment, the spectral characteristics of the toners and those of the image reading unit 100 have already been composited with a lookup table in the HDD 1800-2, and saved with names "SpectR", "SpectG", "SpectB", and "SpectK".

For conversion from R, G, and B luminance signals, the image processor 1900-2 converts R, G, and B luminance signals into C, M, Y, and K density signals. For conversion into C, M, Y, and K density signals, the image processor 1900-2 considers even image processing in the image forming apparatus 1. In the fourth embodiment, a conversion lookup table considering image processing in the image forming apparatus 1 is saved in advance in the HDD 1800-2. More specifically, the fourth embodiment assumes image processing which applies a largest amount of toner, out of image processing methods prepared in the image forming apparatus 1. Correction lookup tables for obtaining an amount of applied toner from R, G, and B luminance signals are saved with names "PredictUCR" and "PredictBG" in the HDD 1800-2.

The image processor 1900-2 performs calculation including conversion based on the above-mentioned lookup tables SpectR, SpectG, SpectB, SpectK, PredictUCR, and PredictBG. As a result, C, M, Y, and K density signals representing amounts of applied toners based on the R, G, and B luminance signals of the scan continuous tone data 4000 are obtained.

First, the image processor 1900-2 obtains C, M, Y, and K density signals C', M', Y', and K' in accordance with the above-described equations (1).

Then, C, M, Y, and K density signals each representing an amount of applied toner are obtained by performing calculation according to the above-described equations (2) for the C', M', Y', and K' values.

UCR is undercolor removal processing considering an image processing method in the image forming apparatus 1. In the fourth embodiment, the undercolor removal processing is performed based on the K' value by using a lookup table considering undercolor removal processing in the image forming apparatus 1. BG is black generation processing considering an image processing method in the image forming apparatus 1. In the fourth embodiment, the black generation processing is also performed based on the K' value by using a lookup table considering black generation processing in the image forming apparatus 1.

The image processor 1900-2 calculates an amount of toner applied on the sheet S by performing the following calculation for the obtained C, M, Y, and K density signals of continuous tones. That is, the image processor 1900-2 performs calculation represented by the above-described equation (3) using the C, M, Y, and K values obtained by the above calculation as input values.

The image processor 1900-2 executes the above-described calculation sequentially for all the pixels of the scan continuous tone data 4000. The image processor 1900-2 saves, in the RAM 1800-1, the SumToner values obtained by these calculations as applied amounts on the sheet S that are obtained from the scan continuous tone data 4000. At this time, the applied amounts are saved as applied toner amount data (4001 in FIG. 23) of the scan continuous tone data in a two-dimensional array of continuous tones.

Then, in step S40-2 of FIG. 22, the image processor 1900-2 performs color processing for the continuous tone raster bitmap data 2000. In this color processing, the image processor 1900-2 performs the following processing. First, the image processor 1900-2 performs UCR (UnderColor Removal) processing. Second, the image processor 1900-2 performs BG (Black Generation) processing. These known processes are performed using lookup tables in the image forming apparatus 1. More specifically, in the fourth embodiment, these lookup tables are saved in advance with names "UCR" and "BG" in the HDD 1800-2. The image processor 1900-2 performs calculation as represented by the above-described equations (4), including conversion based on the lookup tables UCR and BG. In this manner, color processing is executed for the continuous tone raster bitmap data 2000.

The image processor 1900-2 saves, as continuous tone bitmap data 2001 after color processing in the RAM 1800-1, the C, M, Y, and K density signals Cout, Mout, Yout, and Kout in a two-dimensional array of continuous tones obtained by the calculation.

In step S40-3, the image processor 1900-2 calculates an amount of applied toner from the continuous tone bitmap data after color processing. Letting Cout, Mout, Yout, and Kout be the C, M, Y, and K color density signal values of the continuous tone bitmap data after color processing, the applied toner amount SumToner_out of each pixel can be calculated as follows:

$$\text{SumToner\_out} = C\text{out} + M\text{out} + Y\text{out} + K\text{out}$$

The image processor 1900-2 executes this calculation for each pixel of the continuous tone raster bitmap data 2000, and saves the result in the RAM 1800-1. By this processing, the image processor 1900-2 can obtain two-dimensional information representing the applied toner amounts of all the pixels of the continuous tone raster bitmap data. Further, the image processor 1900-2 saves, as applied toner amount information (2002 in FIG. 23) of the continuous tone bitmap data in the RAM 1800-1, two-dimensional information representing the applied toner amounts of all the pixels of the continuous tone raster bitmap data.

In step S40-4, the image processor 1900-2 performs applied toner amount restriction processing for the continuous tone raster bitmap data after color processing. In the fourth embodiment, the applied toner amount restriction processing includes the following processes.

First, the image processor 1900-2 reads out the maximum value of an applied toner amount saved in advance in the HDD 1800-2, and saves it with a variable name "SumToner_max" in the RAM 1800-1. Second, the image processor 1900-2 adds the applied amount data 4001 of the scan continuous tone data and the applied toner amount information 2002 of the continuous tone bitmap data. Based on the sum, the image processor 1900-2 calculates an amount of toner to be applied on the sheet S. More specifically, the image processor 1900-2 performs the following processes to calculate an amount of toner predicted to be applied on the sheet S.

Here, both the applied amount data 4001 of the scan continuous tone data and the applied toner amount information 2002 of the continuous tone bitmap data are two-dimensional arrays. The image processor 1900-2 executes the following calculation while scanning these two two-dimensional arrays along the x- and y-axes shown in FIG. 23.

First, the image processor 1900-2 calculates a maximum applied toner amount considering the applied amount data 4001 of the scan continuous tone data. Then, the image processor 1900-2 obtains the toner restriction ratio of the applied toner amount information 2002 of the continuous tone bitmap data based on the maximum applied toner amount. Finally, the image processor 1900-2 performs applied amount processing for the continuous tone bitmap data 2001 after color processing based on the toner restriction ratio.

To explain this processing in more detail, the fourth embodiment will explain addition processing using virtual codes. First, the array of the applied amount data 4001 of the scan continuous tone data is defined as src_toner[ ][ ], and the reduction ratio of reduction processing performed when the scan continuous tone data is generated is defined as scan_ratio. Further, the array of the applied toner amount information 2002 of the continuous tone bitmap data is defined as print_toner[ ][ ]. The size of these two arrays along the x-axis is defined as width, and the size along the y-axis is defined as height. The image processor 1900-2 performs processing as represented by [Virtual Code 4]. In the following virtual codes, a number and colon at the left end indicate a line number.

[Virtual Code 4]

```
1:   int x, y, sum_toner;
2:
3:   for (x = 0; x < width; x++){
4:      for (y = 0; y < height; y++){
5:         SumToner_max = SumToner_max −
src_toner[x/scan_ratio][y/scan_ratio];
6:
7:         if(SumToner_max < 0){
8:            SumToner_max = 0;
9:         }
10:     }
11:}
```

By this processing, the image processor 1900-2 can calculate a maximum applied toner amount considering the applied amount data 4001 of the scan continuous tone data.

Third, the image processor 1900-2 obtains a restriction ratio tor_ratio for calculating an amount of applied toner of the continuous tone bitmap data after restricting a toner, based on the maximum applied toner amount. More specifically, the image processor 1900-2 performs the following processing. A description of this calculation in addition to the above virtual code is as follows:

[Virtual Code 5]

```
1:   int x, y, sum_toner;
2:   float tor_ratio;
3:
4:   for (x = 0; x < width; x++){
5:      for (y = 0; y < height; y++){
6:         SumToner_max = SumToner_max −
src_toner[x/scan_ratio][y/scan_ratio];
7:
8:         if(SumToner_max <= 0){
9:            //
10:        }else{
11:           tor_ratio = print_toner[x][y]/SumToner_max;
12:        }
13:
14:     }
15: }
```

By this processing, the image processor 1900-2 can obtain a restriction parameter for restricting the applied toner amount of each pixel to be formed on the sheet S.

Fourth, the image processor 1900-2 performs restriction processing for a density signal represented by the continuous tone bitmap data 2001 after color processing by using the restriction parameter tor_ratio for restricting an amount of applied toner. Then, the image processor 1900-2 saves, as the continuous tone bitmap data 2003 after applied amount restriction in the RAM 1800-1, the result of performing restriction processing for the density signal represented by the continuous tone bitmap data 2001 after color processing. More specifically, the image processor 1900-2 performs the following processing. The image processor 1900-2 multiplies each color value of each pixel of the continuous tone bitmap data 2001 after color processing by the restriction parameter tor_ratio for restricting an amount of applied toner. When forming an image in only black on the sheet S, the image processor 1900-2 multiplies K by tor_ratio. When forming an image in four, C, M, Y, and K on the sheet S, the image processor 1900-2 multiplies these four colors by tor_ratio. The two-dimensional array of the bitmap data 2003 after applied toner amount restriction is defined as out bitmap[ ][ ]. A description of this calculation in addition to the above virtual codes is as follows:

[Virtual Code 6]

```
1:   int x, y, sum_toner;
2:   float tor_ratio;
3:
4:   for (x = 0; x < width; x++){
5:      for (y = 0; y < height; y++){
6:         SumToner_max = SumToner_max −
src_toner[x/scan_ratio][y/scan_ratio];
7:
8:         if(SumToner_max <= 0){
9:            out_bitmap [x][y] = 0;
10:        }else{
11:           tor_ratio = print_toner[x][y]/SumToner_max;
12:           out_bitmap[x][y] =
out_bitmap[x][y]*tor_ratio;
13:        }
14:
15: }
16:}
```

By the above series of processes, the image processor 1900-2 can generate the bitmap data 2003 after applied amount restriction as continuous tone bitmap data after restricting the applied toner amount of each pixel to be formed on the sheet S (end of step S40-4 in FIG. 22).

In step S40-5, the image processor 1900-2 performs dither processing for the bitmap data 2003 after applied amount restriction, obtaining image formation bitmap data 3000. In this processing, the image processor 1900-2 reads out a dither pattern saved in advance from the HDD 1800-2, and provides the dither pattern to each pixel of the bitmap data 2003 after applied amount restriction. The image processor 1900-2 saves the obtained image formation bitmap data 3000 in the RAM 1800-1.

As described above, a print controller 1900-3 prints in accordance with the image formation bitmap data 3000 saved in the RAM 1800-1 under the control of a job controller 1900-5.

The fourth embodiment has explained processing when the read resolution of the image reading unit 100 is lower than the resolution of the continuous tone raster bitmap data 2000. By this processing, the image processor calculates the scan continuous tone data 4000 at a low resolution. The fourth embodiment has an effect capable of reducing the calculation cost, and the amounts of resources such as the RAM 1800-1 and the band of a bus 1800-5.

According to the fourth embodiment, the image forming apparatus can generate the applied toner amount information 2002 when printing in consideration of an amount of toner applied on the sheet S in a series of paper conveyance processes for the sheet S. Even when the sheet S has already been printed and the toner has been applied, the image forming apparatus can suppress degradation of the image quality of a printed image arising from scattering of toner caused by a transfer error or fixing error, or the like.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-106314, filed May 7, 2012, which is hereby incorporated by reference herein in its entirety.

What is claimed is:

1. An image forming apparatus comprising:
a reading unit configured to read an image of a sheet to acquire image information of the sheet;
a reception unit configured to receive a print job including image information from an external apparatus;
a determination unit configured to, in a case that the print job designates image formation on a surface of the sheet on which the image has been formed, determine, based on at least the image information of the sheet and the image information included in the print job, whether or not to perform the image formation on the sheet based on the print job; and
a control unit configured to, in a case that the determination unit determines not to perform the image formation on the sheet based on the print job, stop image formation on the sheet, and in a case that the determination unit determines to perform the image formation on the sheet based on the print job, form an image on the sheet in accordance with the image information of the print job.

2. The apparatus according to claim 1, wherein in a case where a sum of a toner amount per unit area to be applied to the sheet based on the image information included in the print job and a toner amount per unit area that has already been applied to the sheet as the image information of the sheet is not smaller than a threshold, the determination unit determines not to perform the image formation on the sheet based on the print job.

3. The apparatus according to claim 1, wherein the determination unit divides the image information of the sheet into unit areas, calculates an average value of densities of pixels per unit area, and in a case where the average value is not smaller than a threshold, determines not to perform the image formation on the sheet based on the print job.

4. The apparatus according to claim 1, wherein in a case where the image information included in the print job and the image information of the sheet overlap each other, the determination unit determines not to perform the image formation on the sheet based on the print job.

5. The apparatus according to claim 2, further comprising a setting unit configured to prompt a user to set the threshold.

6. The apparatus according to claim 3, further comprising a setting unit configured to prompt a user to set the threshold.

7. The apparatus according to claim 1, wherein the reading unit is interposed between a first feed path and a second feed path for conveying the sheet, reads an image of a first surface of the sheet when the sheet passes through the first feed path, and reads an image of a second surface of the sheet when the sheet passes through the second feed path.

8. An image forming apparatus comprising:
a reception unit configured to receive image data to undergo image formation;
a storage unit configured to store image data obtained by reading an image of a sheet;
a first calculation unit configured to calculate a first amount of an image forming agent per unit area applied to the sheet based on the image data stored in the storage unit;
a second calculation unit a second amount of the image forming agent per unit area to be applied to the sheet in a case that an image is formed on the sheet in accordance with the image data received by the reception unit; and
a correction unit configured to correct the image data received by the reception unit in a case that a sum of the first amount and the second amount is not smaller than a threshold.

9. The apparatus according to claim 8, wherein the first calculation unit performs calculation in consideration of at least a spectral characteristic of a sensor which read the image of the sheet, and a spectral characteristic of the image forming agent.

10. The apparatus according to claim 8, wherein in a case that the image forming agent applied to the sheet contains a plurality of colors, the first calculation unit calculates the first amount based on a sum of amounts of image forming agents of the plurality of colors.

11. A method of controlling an image forming apparatus, comprising:
a reading step of reading an image of a sheet to acquire image information of the sheet;
a reception step of receiving a print job including image information from an external apparatus;
a determination step of, when the print job designates image formation on a surface of the sheet on which the image has been formed, determining, based on at least the image information of the sheet and the image information included in the print job, whether or not to perform image formation on the sheet based on the print job; and
a control step of, when image formation on the sheet based on the print job is determined in the determination step to be not performed, stopping image formation on the sheet, and when image formation on the sheet based on the print job is determined in the determination step to be performed, forming an image on the sheet in accordance with the image information of the print job.

12. A non-transitory computer-readable storage medium storing a program for causing a computer to execute a control method defined in claim 11.

13. A method of controlling an image forming apparatus, comprising:
receiving image data to undergo image formation;
storing image data obtained by reading an image of a sheet into a memory;
calculating a first amount of an image forming agent per unit area applied to the sheet based on the image data stored in the memory;
calculating a second amount of the image forming agent per unit area to be applied to the sheet in a case that an image is formed on the sheet in accordance with the image data received in the receiving step; and
correcting the image data received in the receiving step in a case where a sum of the first amount and the second amount is not smaller than a threshold.

14. A non-transitory computer-readable storage medium storing a program for causing a computer to execute a control method defined in claim 13.

* * * * *